US012785078B2

(12) United States Patent
Wu et al.

(10) Patent No.: US 12,785,078 B2
(45) Date of Patent: Nov. 3, 2026

(54) ELECTRODE PLATE, BATTERY AND ELECTRICAL DEVICE

(71) Applicant: CONTEMPORARY AMPEREX TECHNOLOGY (HONG KONG) LIMITED, Hong Kong (CN)

(72) Inventors: Kai Wu, Ningde (CN); Haizu Jin, Ningde (CN); Shuangjuan Peng, Ningde (CN); Lin Peng, Ningde (CN); Baiqing Li, Ningde (CN); Fenggang Zhao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/088,681

(22) Filed: Mar. 24, 2025

(65) Prior Publication Data

US 2025/0226390 A1 Jul. 10, 2025

Related U.S. Application Data

(63) Continuation of application No. PCT/CN2024/071824, filed on Jan. 11, 2024.

(30) Foreign Application Priority Data

Jan. 13, 2023 (WO) ................ PCT/CN2023/072036
Feb. 17, 2023 (WO) ................ PCT/CN2023/076789
(Continued)

(51) Int. Cl.
*H01M 4/36* (2006.01)
*H01M 4/04* (2006.01)
(Continued)

(52) U.S. Cl.
CPC ......... *H01M 4/364* (2013.01); *H01M 4/0404* (2013.01); *H01M 4/1393* (2013.01);
(Continued)

(58) Field of Classification Search
None
See application file for complete search history.

(56) References Cited

U.S. PATENT DOCUMENTS 5,925,483 A 7/1999 Kejha et al.
9,799,921 B2 10/2017 Hashimoto et al.
(Continued)

FOREIGN PATENT DOCUMENTS

CN 1457522 A 11/2003
CN 101651234 A 2/2010
(Continued)

OTHER PUBLICATIONS

Wikipedia FEP document (Year: 0000).*
(Continued)

*Primary Examiner* — Tracy M Dove
(74) *Attorney, Agent, or Firm* — ANOVA LAW GROUP, PLLC

(57) ABSTRACT

An electrode plate includes a current collector and a film layer comprising an active material and an adsorptive polymer disposed on at least one side of the current collector, wherein: the adsorptive polymer satisfies: $3 \leq m_1/n \leq 35$, in which n represent a mass of the adsorptive polymer, and $m_1$ represents a mass of a first substance that is obtained by: adding the adsorptive polymer to a predetermined electrolytic solution at 45° C. to form a polymer system, allowing the polymer system to stand for 60 hours at 45° C. and for ≥24 hours at 25° C., and then filtering the polymer system through a 200-mesh screen to obtain the first substance; and the adsorptive polymer further satisfies: $1.00 \leq m_2/n \leq 1.05$, in
(Continued)

which $m_2$ represents a mass of a second substance, that is obtained by drying the first substance at 60° C. for ≥24 hours.

19 Claims, 5 Drawing Sheets

(30) Foreign Application Priority Data

Feb. 17, 2023 (WO) ................ PCT/CN2023/076793
Feb. 17, 2023 (WO) ................ PCT/CN2023/076843
Nov. 3, 2023 (WO) ........................ 202311457180.1

(51) Int. Cl.

| | |
|---|---|
| ***H01M 4/1393*** | (2010.01) |
| ***H01M 4/1397*** | (2010.01) |
| ***H01M 4/58*** | (2010.01) |
| ***H01M 4/583*** | (2010.01) |
| ***H01M 4/62*** | (2006.01) |
| ***H01M 10/0525*** | (2010.01) |
| *H01M 4/02* | (2006.01) |

(52) U.S. Cl.

CPC ....... *H01M 4/1397* (2013.01); *H01M 4/5825* (2013.01); *H01M 4/583* (2013.01); *H01M 4/623* (2013.01); *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 11,962,010 | B2 | 4/2024 | Okubo et al. |
| 2003/0091456 | A1 | 5/2003 | Bloemacher et al. |
| 2004/0101752 | A1 * | 5/2004 | Oosawa .............. H01M 4/0416 252/182.1 |
| 2006/0257739 | A1 | 11/2006 | Ryu et al. |
| 2008/0241670 | A1 | 10/2008 | Kim et al. |
| 2009/0134360 | A1 | 5/2009 | Komatsu et al. |
| 2009/0274958 | A1 | 11/2009 | Fukumine |
| 2015/0357648 | A1 * | 12/2015 | Sugimoto ............. H01M 4/622 429/217 |
| 2019/0051934 | A1 | 2/2019 | Kim et al. |
| 2019/0198913 | A1 | 6/2019 | Koh et al. |
| 2021/0380745 | A1 | 12/2021 | Commarieu et al. |
| 2022/0271293 | A1 | 8/2022 | Yamada et al. |
| 2022/0271294 | A1 * | 8/2022 | Yamada .............. H01M 4/0404 |
| 2023/0141951 | A1 | 5/2023 | Kadoma et al. |

FOREIGN PATENT DOCUMENTS

| | | | | |
|---|---|---|---|---|
| CN | 102610857 | A | 7/2012 | |
| CN | 103804892 | A | 5/2014 | |
| CN | 104319420 | A | 1/2015 | |
| CN | 105098191 | A | 11/2015 | |
| CN | 105374980 | A | 3/2016 | |
| CN | 108028387 | A | 5/2018 | |
| CN | 108258246 | A | 7/2018 | |
| CN | 108417836 | A | 8/2018 | |
| CN | 108780895 | A | 11/2018 | |
| CN | 109103517 | A | 12/2018 | |
| CN | 109119631 | A | 1/2019 | |
| CN | 109216659 | A | 1/2019 | |
| CN | 109309230 | A | 2/2019 | |
| CN | 110611117 | A | 12/2019 | |
| CN | 112018392 | A | 12/2020 | |
| CN | 112133961 | A | 12/2020 | |
| CN | 112164778 | A | 1/2021 | |
| CN | 112175134 | A | 1/2021 | |
| CN | 112574659 | A | 3/2021 | |
| CN | 113745454 | A | 12/2021 | |
| CN | 112133961 | B | 4/2022 | |
| CN | 114267815 | A | 4/2022 | |
| CN | 114497683 | A | 5/2022 | |
| CN | 114583173 | A | 6/2022 | |
| CN | 114725500 | A | 7/2022 | |
| CN | 115004401 | A | 9/2022 | |
| CN | 115117341 | A | 9/2022 | |
| CN | 115312776 | A | 11/2022 | |
| EP | 2398095 | A | 12/2011 | |
| EP | 2908364 | A1 | 8/2015 | |
| EP | 3806190 | A1 | 4/2021 | |
| EP | 4539170 | A1 | 4/2025 | |
| JP | 63196531 | A | 8/1988 | |
| JP | 2001319693 | A | 11/2001 | |
| JP | 2002260665 | A | 9/2002 | |
| JP | 2002260666 | A | 9/2002 | |
| JP | 2003003078 | A | 1/2003 | |
| JP | 2003249225 | A | 9/2003 | |
| JP | 2004055509 | A | 2/2004 | |
| JP | 2005032549 | A | 2/2005 | |
| JP | 2007035434 | A | 2/2007 | |
| JP | 2010003679 | A | 1/2010 | |
| JP | 2011258351 | A * | 12/2011 | |
| JP | 2012204303 | A | 10/2012 | |
| JP | 2012216347 | A | 11/2012 | |
| JP | 2013229163 | A | 11/2013 | |
| JP | 2014143000 | A | 8/2014 | |
| JP | 2015072901 | A | 4/2015 | |
| JP | 2016025025 | A | 2/2016 | |
| JP | 2016076311 | A | 5/2016 | |
| JP | 2017521813 | A | 8/2017 | |
| JP | 2020035634 | A | 3/2020 | |
| JP | 2020167097 | A | 10/2020 | |
| JP | 2021015769 | A | 2/2021 | |
| JP | 2022187229 | A | 12/2022 | |
| KR | 20150114463 | A | 10/2015 | |
| KR | 20180045816 | A | 5/2018 | |
| KR | 20190090545 | A | 8/2019 | |
| WO | 2008120786 | A1 | 10/2008 | |
| WO | 2019230075 | A1 | 12/2019 | |
| WO | WO-2021015229 | A1 * | 1/2021 | ........... C09D 127/16 |
| WO | 2022160382 | A1 | 8/2022 | |
| WO | 2023010924 | A1 | 2/2023 | |
| WO | 2023136665 | A1 | 7/2023 | |

OTHER PUBLICATIONS

The World Intellectual Property Organization (WIPO) International Search Report for PCT/CN2023/072036 Oct. 7, 2023 4 Pages (including translation).

The World Intellectual Property Organization (WIPO) International Search Report for PCT/CN2023/076789 Mar. 22, 2023 6 Pages (including translation).

The World Intellectual Property Organization (WIPO) International Search Report for PCT/CN2023/076793 Nov. 16, 2023 6 Pages (including translation).

The World Intellectual Property Organization (WIPO) International Search Report for PCT/CN2023/076843 Nov. 17, 2023 4 Pages (including translation).

The World Intellectual Property Organization (WIPO) International Search Report for PCT/CN2024/071824 Apr. 11, 2024 6 Pages (including translation).

The European Patent Office (EPO) The Extended European Search Report for Application No. 23915363.8 Oct. 7, 2025 11 Pages.

The Korean Intellectual Property Office Request for the Submission of an Opinion for Application No. 10-2025-7004890 Nov. 27, 2025 16 Pages (including translation).

The European Patent Office (EPO) The Extended European Search Report for Application No. 24741326.3 Nov. 18, 2025 7 Pages.

Gören A et al: "Influence of fluoropolymer binders on the electrochemical performance ofC—LiFePO4based cathodes", Solid State Ionics, vol. 295, Sep. 1, 2016, pp. 57-64.

State Intellectual Property Office of China Notice of Grant of Invention Patent Right for Application No. 202311457180.1, Jan. 15, 2026 6 pages (including translation).

(56) References Cited

OTHER PUBLICATIONS

The Japan Patent Office (JPO) Notice of Reasons for Refusal for Application No. 2025-504332 Jan. 26, 2026 6 Pages (including translation).
Korean Intellectual Property Office (KIPO) Request for the Submission of an Opinion for Application No. 10-2025-7007395 Apr. 22, 2025 21 Pages (including translation).
Korean Intellectual Property Office (KIPO) Request for the Submission of an Opinion for Application No. 10-2025-7007858 Jan. 20, 2026 20 Pages (including translation).
The Japan Patent Office (JPO) Notice of Reasons for Refusal for Application No. 2025-514222 Aug. 21, 2025 20 Pages (including translation).
The Japan Patent Office (JPO) Notice of Reasons for Refusal for Application No. 2025-515452 Mar. 18, 2026 17 Pages (including translation).
United States Patent and Trademark Office (USPTO) Final Office Action for U.S. Appl. No. 19/081,899 Nov. 4, 2025 23 Pages.
The European Patent Office (EPO) The Extended European Search Report for Application No. 23921962.9 Sep. 25, 2025 5 Pages.
The European Patent Office (EPO) The Extended European Search Report for Application No. 23921964.5 Mar. 26, 2026 82 Pages.
The European Patent Office (EPO) The Extended European Search Report for Application No. 23921981.9 Mar. 26, 2026 14 Pages.
Korean Intellectual Property Office (KIPO) Written Decision on Registration for Application No. 10-2025-7007395 Nov. 25, 2025 6 Pages (including translation).
United States Patent and Trademark Office (USPTO) Final Office Action for U.S. Appl. No. 19/081,899 Mar. 2, 2026 24 Page.
United States Patent and Trademark Office (USPTO) Non Final Office Action for U.S. Appl. No. 19/081,899 Jul. 11, 2025 16 Page.
Poly(ethylene oxide). Datasheet [online]. SigmaAldrich, [retrieved on Jul. 8, 2025]. Retrieved from the Internet: <URL: https://www.sigmaaldrich.com/us/en/product/aldrich/181994>. (Year: 2025).
Poly(tetrahydrofuran). Datasheet [online]. SigmaAldrich, 2023 [retrieved on Oct. 22, 2025]. Retrieved from the Internet: <URL: https://www.sigmaaldrich.com/us/en/product/aldrich/345296> (Year: 2023).
Poly(vinyl methyl ether). Datasheet [online]. SciPoly, 2020 [retrieved on Oct. 22, 2025]. Retrieved from the Internet: <URL: https://scipoly.com/shop/polyvinyl-methyl-ether-6/> (Year: 2020).
Ethyl Propyl Ether. Datasheet [online]. 3Com Corporation, 2020 [retrieved on Oct. 22, 2025]. Retrieved from the Internet: <URL: https://www.tcichemicals.com/US/en/p/E0052> (Year: 2020).
Japan Patent Office Notice of Reasons for Refusal for Application No. 2025-515452 Sep. 1, 2026 10 pages (including translation).

* cited by examiner

5

ELECTRODE PLATE, BATTERY AND ELECTRICAL DEVICE

CROSS-REFERENCE TO RELATED APPLICATION

The present application is a continuation of International Application No. PCT/CN2024/071824, filed on Jan. 11, 2024, and claims the priority of Chinese patent application No. 202311457180.1, filed on Nov. 3, 2023 and entitled "ELECTRODE PLATE, BATTERY AND ELECTRICAL DEVICE", the entirety of which is herein incorporated by reference.

TECHNICAL FIELD

The present application relates to the field of battery technology, in particular to an electrode plate, a battery cell, a battery and an electrical device.

BACKGROUND

Batteries have the characteristics of high capacity and long life, so they are widely used in electronic devices, such as cellphones, notebook computers, battery cars, electric cars, electric airplanes, electric boats, electric toy cars, electric toy boats, electric toy airplanes, and power tools, and the like.

With the wider range of battery applications, the requirements for battery performance have become progressively more stringent. However, the cycle performance of batteries needs to be further improved.

SUMMARY

The present application is conducted in view of the aforementioned subject matter, and its objective is to provide an electrode plate, a battery, and an electrical device.

In a first aspect, the present application proposes an electrode plate comprising a current collector and a film layer disposed on at least one side of the current collector, the film layer comprising an active material and an adsorptive polymer, wherein:

the adsorptive polymer satisfies: $3 \leq m_1/n \leq 35$, in which n represents a mass of the adsorptive polymer, in grams, and $m_1$ represents a mass, in grams, of the first substance that is obtained by:

adding the adsorptive polymer to a predetermined electrolytic solution at 45° C. to form a polymer system, wherein a mass ratio of the adsorptive polymer to the predetermined electrolytic solution is 1:15, the predetermined electrolytic solution comprises dimethyl carbonate, ethyl methyl carbonate, vinylene carbonate, and lithium hexafluorophosphate, in which dimethyl carbonate, ethyl methyl carbonate, and vinylene carbonate are present in a same mass, and a concentration of lithium hexafluorophosphate is 1 mol/L; and allowing the polymer system to stand for 60 hours at 45° C. and for ≥24 hours at 25° C., and then filtering the polymer system through a 200-mesh screen to obtain remains as the first substance; and the adsorptive polymer further satisfies: $1.00 \leq m_2/n \leq 1.05$, in which $m_2$ represents a mass, in grams, of the second substance, that is obtained by:

drying the first substance at 60° C. for ≥24 hours to obtain remains as the second substance.

Accordingly, in the embodiments of the present application, the adsorptive polymer undergoes a physically reversible adsorption process with the electrolytic solution. When the system is at slightly higher temperatures, such as a higher temperature at which a battery system can normally operate, the adsorptive polymer can achieve the stretching of its molecular chains, promoting the mutual attraction and physical binding between the molecular chains of the adsorptive polymer and the solvent, forming an in-situ gel-state substance; when the system temperature drops to a lower temperature at which the battery system can normally operate, the in-situ gel-state substance can adhere to the surface of the active material particles and lock the electrolytic solution within the space environment of the adsorptive polymer, thereby protecting the active material interface while facilitating the normal transmission of lithium ions. At a further higher system temperature, such as a further higher temperature at which a battery system can normally operate or under dry and other environments lack of electrolytic solution, the locked electrolytic solution can be released, achieving elastic storage of electrolytic solution. During the expansion and deformation of active particles during the charging and discharging process, the gelatinized adsorptive polymer can promptly release the liquid electrolytic solution to buffer the deformation of the interface between the polymer/active particles, thereby enhancing the cycle performance of the battery.

In some embodiments, $5 \leq m_1/n \leq 35$.

In some embodiments, based on the total mass of the film layer, a mass content of the adsorptive polymer is ≤5%, optionally from 0.05% to 5%; and/or the coating weight of the adsorptive polymer is from 0.5 mg/1540.25 $mm^2$ to 2 mg/1540.25 $mm^2$. When the content of the adsorptive polymer is within the aforementioned range, the adsorptive polymer can effectively improve the interface performance and structural stability of the electrode plate.

In some embodiments, the adsorptive polymer includes a fluoropolymer, the crystallinity of which, as measured by differential scanning calorimetry, is $Xc_1$%, and $0<Xc_1 \leq 30$;

the fluoropolymer has a melting temperature of $T_{m1}$° C., and $0<T_{m1}140$;

further optionally, the fluoropolymer has a glass transition temperature of $T_{g1}$° C., and $-150 \leq T_{g1} \leq 60$;

more optionally, the fluoropolymer includes at least one of the compounds shown in Formula (AI) to Formula (AIII):

Formula (AI)

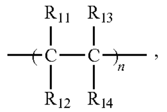

Formula (AII)

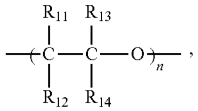

Formula (AIII)

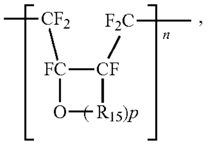

in Formulas (AI) and (AII), $R_{11}$, $R_{12}$, $R_{13}$, and $R_{14}$ each independently comprise a hydrogen atom, a fluorine atom, a chlorine atom, a bromine atom, a substituted or unsubstituted C1-C3 alkyl group, or a substituted or unsubstituted C1-C3 alkoxy group, and at least one of $R_{11}$, $R_{12}$, $R_{13}$, and $R_{14}$ comprises a fluorine atom;

in Formula (AIII), $R_{15}$ comprises a single bond, a substituted or unsubstituted C1-C3 alkyl group; p is a positive integer selected from 1 to 3; n is a positive integer selected from 1000 to 30000.

Thus, fluoropolymers have relatively low crystallinity, melting temperature, or glass transition temperature, the molecular chains of fluoropolymers have better flexibility, and the chain segments of the molecular chains have better flexibility, making it easier for adjacent molecular chains to be separated. Solvent molecules in the electrolytic solution can enter between the molecular chains of the fluoropolymers, forming a gel-state substance, which effectively stores the electrolytic solution on the surface of the active material, enhancing the infiltration of the active material. At higher temperatures, the gel-state substance can release solvent molecules, which will return to the polymer state, thus possessing certain elasticity. This allows the interface between the fluoropolymer and the active material particles to have deformation capabilities, which can deform during the battery's charging and discharging cycles, reducing the risk of structural delamination within the electrode plate, enhancing the overall structural stability of the electrode plate, and improving the cycle performance of the battery cell.

In some embodiments, the adsorptive polymer includes an ether polymer, which has a slope $K_1$ of an elastic modulus G'-loss modulus G" curve that is measured by subjecting a sheet-like structure formed of the ether polymer to dynamic frequency scanning tests at $(T_{m2}+20)$ ° C., and $1<K_1<\infty$, where $T_{m2}$° C. represents a melting temperature of the ether polymer; optionally, $1<K_1\leq100$; further optionally, $1<K_1\leq10$;

optionally, the ether polymer has a glass transition temperature of $T_{g2}$° C., and $-100\leq T_{g2}\leq50$; optionally, $-80\leq T_{g2}\leq30$;

further optionally, the ether polymer optionally includes at least one of the compounds shown in Formula (BI) and Formula (BII):

Formula (BI)

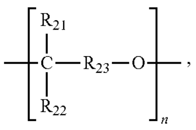

and

Formula (BII)

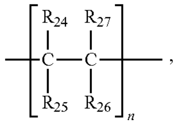

in Formula (BI), $R_{21}$ and $R_{22}$ each independently comprise a hydrogen atom, a substituted or unsubstituted C1-C3 alkyl group, or a substituted or unsubstituted C1-C3 alkoxy group; $R_{23}$ comprises a substituted or unsubstituted C1-C5 alkylene group;

in Formula (BII), $R_{24}$ to $R_{27}$ each independently comprise a hydrogen atom, a substituted or unsubstituted C1-C3 alkyl group, a substituted or unsubstituted C1-C3 alkoxy group or ether group, and at least one of $R_{24}$ to $R_{27}$ comprises a substituted or unsubstituted C1-C3 alkoxy group or ether group;

the ether polymer has a polymerization degree n selected from any positive integer between 1500 and 25000.

As a result, when the ether polymer of the present application meets the above range, it can further reduce the entanglement of the molecular chains, which is beneficial for the diffusion of solvent molecules in the electrolytic solution between the molecular chains and facilitates the formation of a gel-state substance. Moreover, the ether polymer still maintains a certain degree of molecular chain entanglement, which can effectively store the electrolytic solution and enhance the infiltration of the active material. At higher temperatures, the gel-state substance can release solvent molecules, which will return to the polymer state, thus possessing a certain degree of elasticity. This allows the interface between the ether polymer and the active material particles to have deformability, which can deform during the battery's charging and discharging cycles, reducing the risk of internal structural delamination of the electrode plate, enhancing the overall structural stability of the electrode plate, and improving the cycle performance of the battery cell.

In some embodiments, the adsorptive polymer includes an ester polymer, which has a slope $K_2$ of an elastic modulus G'-loss modulus G" curve that is measured by subjecting a sheet-like structure formed of the ether polymer to dynamic frequency scanning tests at $(T_{m3}+20°)$ ° C., and $1<K_2\leq\infty$; $T_{m3}$° C. represents a melting temperature of the ester polymer;

optionally, $1<K_2\leq100$; further optionally, $1<K_2\leq10$;

optionally, the ester polymer has a glass transition temperature of $T_{g3}$° C., in which $-100\leq T_{g3}\leq50$; optionally, $-80\leq T_{g3}\leq30$;

further optionally, the ester polymer optionally comprises at least one of the compounds shown in Formula (CI) to Formula (CIII):

Formula (CI)

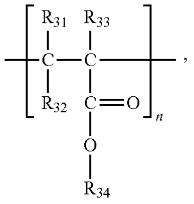

in which, $R_{31}$, $R_{32}$, and $R_{33}$ each independently comprise a hydrogen atom or a substituted or unsubstituted C1-C8 alkyl group; $R_{34}$ comprises a substituted or unsubstituted C1-C8 alkyl group or a substituted or unsubstituted C1-C8 hydroxyalkyl group;

Formula (CII)

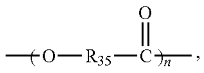

in which, $R_{35}$ comprises a substituted or unsubstituted C2-C6 alkylene group; optionally, $R_{35}$ each independently comprises a substituted or unsubstituted C2-C4 alkylene group;

Formula (CIII)

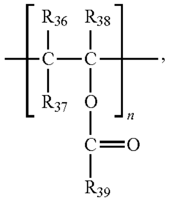

in which, $R_{36}$, $R_{37}$, and $R_{38}$ each independently comprise a hydrogen atom or a substituted or unsubstituted C1-C8 alkyl group; $R_{39}$ comprises a substituted or unsubstituted C1-C8 alkyl group;

optionally, $R_{36}$, $R_{37}$, and $R_{38}$ each independently comprise a hydrogen atom or a substituted or unsubstituted C1-C4 alkyl group;

the ester polymer has a polymerization degree n selected from any positive integer between 800 and 20000.

As a result, when the ester polymer of the present application meets the above range, it can further reduce the entanglement of the molecular chains, which is beneficial for the diffusion of solvent molecules in the electrolytic solution between the molecular chains and facilitates the formation of a gel-state substance. Moreover, the ester polymer still maintains a certain degree of molecular chain entanglement, which can effectively store the electrolytic solution and enhance the infiltration of the active material. At higher temperatures, the gel-state substance can release solvent molecules, which will return to the polymer state, thus possessing a certain degree of elasticity. This allows the interface between the ester polymer and the active material particles to have deformability, which can deform during the battery's charging and discharging cycles, reducing the risk of internal structural delamination of the electrode plate, enhancing the overall structural stability of the electrode plate, and improving the cycle performance of the battery cell.

In some embodiments, the adsorptive polymer includes an aldehyde-ketone polymer, which has a slope $K_3$ of an elastic modulus G'-loss modulus G" curve that is measured by subjecting a sheet-like structure formed of the ether polymer to dynamic frequency scanning tests at $(T_{m4}+20)$ ° C., and $0.8 \le K_3 \le \infty$; $T_{m4}$° C. represents a melting temperature of the aldehyde-ketone polymer; optionally, $0.8 \le K_3 \le 100$; further optionally, $0.8 \le K_3 \le 10$; optionally, the aldehyde-ketone polymer has a glass transition temperature of $T_{g4}$° C., and $-100 \le T_{g4} \le 50$; optionally, $-80 \le T_{g4} \le 30$;

further optionally, the aldehyde-ketone polymer optionally comprises at least one of the compounds shown in Formula (DI) and Formula (DII):

Formula (DI)

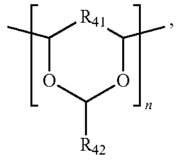

in which, $R_{41}$ comprises a single bond, a substituted or unsubstituted C1-C6 alkylene group; $R_{42}$ comprises a hydrogen atom, a substituted or unsubstituted C1-C6 alkyl group;

Formula (DII)

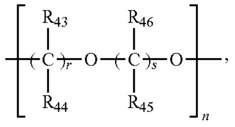

in which, $R_{43}$ to $R_{46}$ each independently comprise a hydrogen atom, a hydroxyl group, a substituted or unsubstituted C1-C3 alkyl group, a substituted or unsubstituted C1-C3 hydroxyalkyl group, or a substituted or unsubstituted C1-C3 alkoxy group;

r and s each independently are an integer selected from 0 to 5, and at least one of r and s is a positive integer;

the aldehyde-ketone polymer has a polymerization degree n selected from any positive integer between 500 and 15000.

As a result, when the aldehyde-ketone polymer of the present application meets the above range, it can further reduce the entanglement of the molecular chains, which is beneficial for the diffusion of solvent molecules in the electrolytic solution between the molecular chains and facilitates the formation of a gel-state substance. Moreover, the aldehyde-ketone polymer still maintains a certain degree of molecular chain entanglement, which can effectively store the electrolytic solution and enhance the infiltration of the active material. At higher temperatures, the gel-state substance can release solvent molecules, which will return to the polymer state, thus possessing a certain degree of elasticity. This allows the interface between the aldehyde-ketone polymer and the active material particles to have deformability, which can deform during the battery's charging and discharging cycles, reducing the risk of internal structural delamination of the electrode plate, enhancing the overall structural stability of the electrode plate, and improving the cycle performance of the battery cell.

In some embodiments, the adsorptive polymer has a molecular weight between $2.0\times10^5$ g/mol and $1.2\times10^6$ g/mol.

In a second aspect, the present application provides a battery comprising the electrode plate according to any embodiment of the first aspect of the present application.

In some embodiments, the electrode plate is a positive electrode plate.

In some embodiments, the electrode plate is a negative electrode plate.

In a third aspect, the present application provides an electrical device comprising the battery according to the second aspect of the present application.

DESCRIPTION OF THE DRAWINGS

In order to explain the technical solutions of the embodiments of the present application more clearly, the following will briefly introduce the drawings that need to be used in the embodiments of the present application. Apparently, the drawings described below are only some embodiments of the present application. A person of ordinary skill in the art can obtain other drawings based on the accompanying drawings without creative work.

Figure 1:
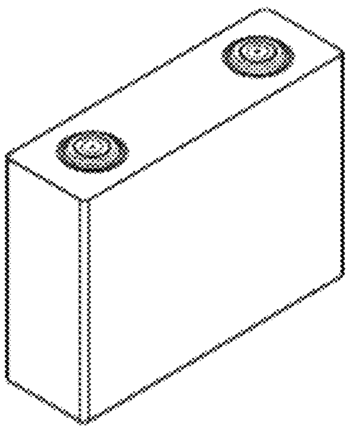
FIG. 1 is a schematic diagram of a battery cell according to an embodiment of the present application.

The drawings are not drawn to actual scale.

Reference numerals are as follows:

1. Battery pack; 2. Upper box body; 3. Lower box body; 4. Battery module; 5. Battery cell; 51. Casing; 52. Electrode assembly; 53. Cover plate; 54. Electrical device.

DETAILED DESCRIPTION

Hereinafter, embodiments of the electrode plate, the battery and the electrical device of the present application, will be described in detail with reference to the accompanying drawings as appropriate. However, unnecessary detailed descriptions may be omitted in some cases, for example the detailed description of a well-known item or the repetitive description of an actually identical structure, so as to prevent the following description from becoming unnecessarily redundant and to facilitate understanding by those skilled in the art. In addition, the drawings and the following description are provided for those skilled in the art to fully understand the present application, and are not intended to limit the subject matter described in the claims.

The "range(s)" disclosed in this application is/are defined in the form of lower and upper limits, and a given range is defined by selection of a lower limit and an upper limit that define boundary of the particular range. Ranges defined in this manner may or may not be inclusive of the endpoints, and may be arbitrarily combined. That is, any lower limit may be combined with any upper limit to form a range. For example, if the ranges of 60-120 and 80-110 are listed for a particular parameter, it is to be understood that the ranges of 60-110 and 80-120 are also contemplated. Additionally, if the minimum range values 1 and 2 are listed, and the maximum range values 3, 4, and 5 are listed, the following ranges are all expected: 1-3, 1-4, 1-5, 2-3, 2-4 and 2-5. In the present application, unless stated otherwise, the numerical range "a-b" represents an abbreviated representation of any combination of real numbers between a and b, where both a and b are real numbers. For example, the numerical range "0-5" means that all real numbers between "0-5" have been listed herein, and the range "0-5" is just an abbreviated representation of the combination of these numerical values. In addition, when a parameter is expressed as an integer greater than or equal to 2, it is equivalent to disclose that the parameter is, for example, an integer of 2, 3, 4, 5, 6, 7, 8, 9, 10, 11, 12, and the like.

Unless stated otherwise, all the embodiments and the optional embodiments of the present application can be combined with each other to form a new technical solution, and such technical solution should be considered to be included in the disclosure of the present application.

Unless stated otherwise, all technical features and optional technical features of the present application can be combined with each other to form a new technical solution, and such technical solution should be considered to be included in the disclosure of the present application.

Unless stated otherwise, all steps of the present application can be carried out sequentially, and also can be carried out randomly, preferably they are carried out sequentially. For example, the method includes steps (a) and (b), indicating that the method may include steps (a) and (b) performed in sequence, or that the method may include steps (b) and (a) performed in sequence. For example, reference to the method further comprising step (c) indicates that step (c) may be added to the method in any order. As an example, the method may comprises steps (a), (b) and (c), steps (a), (c) and (b), or steps (c), (a) and (b), and the like.

The terms "more than one" and "a plurality of" means two or more, unless otherwise stated and specifically limited.

The term "alkyl" encompasses both linear and branched alkyl groups. For example, alkyl groups may be C1 to C5 alkyl, C1 to C4 alkyl, C1 to C3 alkyl, or C1 to C2 alkyl. In some embodiments, alkyl groups include methyl, ethyl, propyl, isopropyl, butyl, isobutyl, and the like. Additionally, alkyl groups may be optionally substituted. When substituted, the substituents include fluorine atoms.

The term "alkoxy" refers to a group in which an alkyl group is connected to an oxygen atom through a single bond. For instance, alkoxy groups may be C1 to C5 alkoxy, C1 to C3 alkoxy, or C1 to C2 alkoxy. In some examples, alkoxy groups can include methoxy, ethoxy, and propoxy. Moreover, alkoxy groups may be optionally substituted.

The term "halogen atom" refers to atoms such as fluorine, chlorine, bromine, and the like.

The term "hydrogen" refers to 1H (protium, H), 2H (deuterium, D), or 3H (tritium, T). In various embodiments, "hydrogen" may be 1H (protium, H).

A battery comprises an electrode assembly and an electrolytic solution; the electrode assembly comprises a positive electrode plate, a negative electrode plate, and a separator; the positive electrode plate comprises a positive electrode film containing a positive active material that can provide active ions; the negative electrode plate comprises a negative electrode film containing a negative active material; the separator is placed between the positive and negative electrode plates, primarily to prevent short-circuiting therebetween and to allow active ions to pass through freely to form a circuit.

The active material layer tends to exhibit poor electrolytic solution affinity, and the electrolytic solution has poor infiltration to the active material layer, resulting in poor liquid storage capacity of the active material layer. In the process of using, transporting, or assembling the battery into a module, the battery may be subjected to external squeezing pressure, and the external squeezing pressure extrudes the electrolytic solution in the active material layer to the outside of the active material layer, resulting in gradual difficulty in sucking back the electrolytic solution and leading to a decrease in the capacity of the battery, and deteriorating the cycle performance of the battery.

In related technology, it is considered to introduce a polymer capable of realizing in-situ polymerization in the electrode plate to realize the locking of the electrolytic solution, but in the process of realizing in-situ polymerization to form an in-situ gel, basically all of the electrolytic solution can be locked inside the polymer, and the electrolytic solution loses its flow state, which results in the polymer and the active material particles presenting a solid-solid interface, and the electrode plate has a poorer deformation ability. During the battery's charging and discharging cycles, the deformation adaptability of the electrode plate is poor, and it is easy to produce the solid-solid interface peeling, the electrolytic solution breaks the bridge, and the cycle performance of the battery is deteriorated, thus failing to solve the above problem.

In view of the above problems, the present application proposes an electrode plate, wherein the film layer of the electrode plate comprises an active material and an adsorptive polymer, and the adsorptive polymer is capable of physically adsorbing electrolytic solution on the surface of the particles of the active material to form a liquid-locking effect and enhance the electrolytic solution's infiltration to the electrode plate; in environments with elevated battery system temperatures or dry conditions that lead to a lack of electrolytic solution, it can elastically release the electrolytic solution, thereby improving the deformation ability of the interface between the polymer and the active material. During the battery's charging and discharging cycles, it can buffer the deformation at the interface between the adsorptive polymer and the active material, enhancing the structural stability of the electrode plate and thus improving the battery's cycle performance.

The following provides a detailed description of the technical solution proposed in the present application.

Electrode Plate

In a first aspect, the present application provides an electrode plate comprising a current collector and a film layer disposed on at least one side of the current collector, the film layer comprising an active material and an adsorptive polymer, wherein:

the adsorptive polymer satisfies: $3 \le m_1/n \le 35$, in which n represents a mass of the adsorptive polymer, in grams, and $m_1$ represents a mass, in grams, of a first substance that is obtained by:

adding the adsorptive polymer to a predetermined electrolytic solution at 45° C. to form a polymer system, wherein a mass ratio of the adsorptive polymer to the predetermined electrolytic solution is 1:15, the predetermined electrolytic solution comprises dimethyl carbonate, ethyl methyl carbonate, vinylene carbonate, and lithium hexafluorophosphate, in which dimethyl carbonate, ethyl methyl carbonate, and vinylene carbonate are present in a same mass, and a concentration of lithium hexafluorophosphate is 1 mol/L; and allowing the polymer system to stand for 60 hours at 45° C. and for ≥24 hours at 25° C., and then filtering the polymer system through a 200-mesh screen to obtain remains as the first substance; and the adsorptive polymer further satisfies: $1.00 \le m_2/n \le 1.05$, in which $m_2$ represents a mass, in grams, of a second substance, that is obtained by:

drying the first substance at 60° C. for ≥24 hours to obtain remains as the second substance.

The predetermined electrolytic solution is designed to be similar or essentially the same as the electrolytic solution used in the battery. By mixing the adsorptive polymer with the predetermined electrolytic solution, the state of the adsorptive polymer within the battery system can be simulated. Solvents such as dimethyl carbonate (DMC), ethyl methyl carbonate (EMC), and ethylene carbonate (EC) can be considered as the solvents for the predetermined electrolytic solution, with lithium hexafluorophosphate ($LiPF_6$) as the lithium salt.

After the polymer system is allowed to stand at 45° C. for 60 hours and at 25° C. for at least 24 hours, at least a portion of the polymer system transforms into a gel-state material after the two-stage standing process, and the polymer system after undergoing two stages of the standing treatment is filtered through a 200-mesh screen to leave the first substance, and the predetermined electrolytic solution that is not involved in the formation of the gel-state substance may be filtered to be removed. In the embodiment of the present application, $m_1/n$ can be defined as a sedimentation value, which characterizes the ability of the adsorptive polymer and the predetermined electrolytic solution to transform into a gel-state material. The first substance primarily comprises the gel-state substance formed by the adsorptive polymer and the predetermined electrolytic solution, with the structural units of the adsorptive polymer remaining substantially unchanged. A value of $3 \le m_1/n \le 15$ indicates a strong ability of the adsorptive polymer to form a gel-state material, promoting the extension of molecular chains at relatively high temperatures, such as 45° C., facilitating the attraction and physical binding between the adsorptive polymer molecular chains and the solvent in the electrolytic solution, which is beneficial for the combination of the polymer chains with the solvent and thus storing electrolytic solution in the film layer. At lower safe operating temperatures of the battery, such as 25° C., the adsorptive polymer may not be mobile, maintaining its adherence to the surface of the active material and locking the electrolytic solution within the space environment of the adsorptive polymer, improving the liquid storage capacity of the film layer, and the infiltration of the electrolytic solution to the film layer is better, which is favorable for the normal transmission of lithium ions. Additionally, the adsorptive polymer can provide good protection for the active material, reducing interface side reactions and thereby improving the cycle performance of secondary batteries using adsorptive polymers.

After drying the first substance at 60° C. for at least 24 hours, the second substance is obtained. The drying process is the loss of the predetermined electrolytic solution from the first substance. As the predetermined electrolytic solution gradually evaporates, the remaining second substance primarily includes the adsorptive polymer, which has a structural composition essentially the same as the adsorptive polymer originally added to the predetermined electrolytic solution. In the present application, $m_2/n$ can be defined as the de-fluidization capability, which characterizes the ability of the first substance to release the predetermined electrolytic solution. A value of $1.00 \le m_2/n \le 1.05$ indicates that there is not much difference between the content of the second substance and adsorptive polymer, and the first substance has a stronger ability to release the predetermined electrolytic solution. After the adsorptive polymer forms a gel-state material, it can release the locked predetermined electrolytic solution that has been locked by the gel-state substance in the case of relatively high temperature or drying and other environments such as lack of electrolytic solution, so as to realize elastic storage of predetermined electrolytic solution. The adsorptive polymer that remains after the release of the predetermined electrolytic solution can improve the deformation ability of the interface between the adsorptive polymer and the active material, buffer the deformation of the interface between the adsorptive polymer and the active material during the battery's charging and discharging cycles, and improve the structural stability of the electrode plate, and thus enhance the cycle performance of batteries.

The adsorption process of the adsorptive polymer to the electrolytic solution is physically reversible. At slightly higher temperatures, such as a higher temperature at which a battery system can normally operate (a first temperature), the adsorptive polymer can achieve the stretching of its molecular chains, promoting the mutual attraction and physical binding between the molecular chains of the adsorptive polymer and the solvent to form an in-situ gel-state substance. When the system temperature drops to a lower temperature at which the battery system can normally operate (a second temperature), the in-situ gel-state substance can adhere to the surface of the active material particles and lock the electrolytic solution within in a space environment where the adsorptive polymer is located, thereby protecting the active material interface while facilitating the normal transmission of lithium ions. At a further higher system temperature, such as a further higher temperature at which a battery system can normally operate (a third temperature) or under dry and other environments lack of electrolytic solution, the locked electrolytic solution can be released, achieving elastic storage of electrolytic solution. During the expansion and deformation of active particles during the charging and discharging process, the gelatinized adsorptive polymer can promptly release the liquid electrolytic solution to buffer the deformation of the interface between the polymer/active particles, thereby enhancing the cycle performance of the battery. In the present application, the second temperature is less than the first temperature, and the first temperature is less than the third temperature.

In the embodiments of the present application, $3 \leq m_1/n \leq 35$; optionally, $5 \leq m_1/n \leq 35$. As an example, $m_1/n$ may be 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 16, 17, 18, 19, 20, 21, 22, 23, 24, 25, 26, 27, 28, 29, 30, 31, 32, 33, 34, 35, or in a range consisting any two of the aforementioned values.

In some embodiments, the adsorptive polymer may comprise at least one of fluoropolymers, ether polymers, ester polymers, or aldehyde-ketone polymers. The adsorptive polymer is capable of reversibly adsorbing and desorbing the electrolytic solution, allowing the electrolytic solution to effectively infiltrate the active material and improve the structural stability of the electrode plate, thereby enhancing the cycle performance of the battery cell.

The specific types of adsorptive polymers are described as follows.

[Fluoropolymers]

In some embodiments, the adsorptive polymer may comprise fluoropolymers.

In some embodiments, the fluoropolymer has a crystallinity of $X_{c1}$%, as measured by differential scanning calorimetry, and $0 < X_{c1} \leq 30$. As an example, the crystallinity $X_{c1}$% of the fluoropolymer, as measured by differential scanning calorimetry, may be 1%, 5%, 10%, 15%, 20%, 25%, 30%, or in a range consisting of any two of the aforementioned values.

In some embodiments, the fluoropolymer has a melting temperature of $T_{m1}$° C., and $0 < T_{m1} \leq 140$. As an example, the melting temperature of the polymer may be 10° C., 20° C., 50° C., 70° C., 90° C., 100° C., 120° C., 140° C., or in a range consisting any two of the aforementioned values.

In some embodiments, the fluoropolymer has a glass transition temperature of $T_{g1}$° C., and $-150 \leq T_{g1} \leq 60$. As an example, the glass transition temperature may be −150° C., −140° C., −135° C., −130° C., −125° C., −120° C., −110° C., −100° C., −90° C., −80° C., −70° C., −65° C., −60° C., −50° C., −45° C., −40° C., −35° C., −30° C., −25° C., −20° C., −15° C., −10° C., −5° C., 0° C., 5° C., 10° C., 15° C., 20° C., 25° C., 30° C., 40° C., 45° C., 50° C., 55° C., 60° C., or in a range consisting any two of the aforementioned values.

Crystallization refers to the process by which atoms, ions, or molecules in a material are arranged in a certain spatial order to form an organized structure. The conformation of the adsorptive polymer during crystallization is determined by both intramolecular and intermolecular factors, with intermolecular forces affecting the packing density between molecular chains. The crystallinity $X_{C1}$ is used to characterize the degree of crystallization in the material and can be measured by Differential Scanning Calorimetry (DSC). Specifically, the test procedure is as follows: taking 0.5 g to 0.8 g of a sample, placing it in a carrier crucible, and subjecting it to a heating and cooling cycle under nitrogen atmosphere, with a heating rate of 10° C./min from an initial temperature 20° C. below the material's intrinsic $T_{g1}$ to a final temperature 20° C. above the material's intrinsic $T_{m1}$. The actual glass transition temperature $T_{g1}$ and melting temperature $T_{m1}$ are determined based on the endothermic and exothermic peaks or transition points observed during the process.

Thus, if the fluoropolymer has a relatively low crystallinity, melting temperature, or glass transition temperature, the molecular chain of the fluoropolymer is flexible; the more flexible the chain segments of the molecular chain are, the easier it is for the adjacent molecular chains to be separated, and the solvent molecules in the electrolytic solution enter the molecular chain of the fluoropolymer to form a gel-state substance, effectively storing the electrolytic solution on the surface of the active material and enhancing the infiltration performance of the active material. At higher temperatures, the gel-state substance can release solvent molecules and restore the polymer state, which has a certain degree of elasticity, so that the interface between the fluoropolymer and the active material particles has the ability to deform, so that it can deform during the battery's charging and discharging cycles, reduce the risk of structural delamination within the electrode plate, improve the overall structural stability of the electrode plate, and improve the cycle performance of the battery cell.

In some embodiments, the fluoropolymers may comprise at least one of the compounds shown in Formulas (AI) to (AIII).

The compound represented by Formula (AI) is as follows:

Formula (AI)

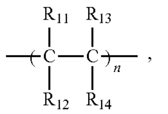

in Formula (AI), $R_{11}$, $R_{12}$, $R_{13}$, and $R_{14}$ each independently comprise a hydrogen atom, a fluorine atom, a chlorine atom, a bromine atom, a substituted or unsubstituted C1-C3 alkyl group, or a substituted or unsubstituted C1-C3 alkoxy group, and at least one of $R_{11}$, $R_{12}$, $R_{13}$, and $R_{14}$ comprises a fluorine atom.

Optionally, $R_{11}$, $R_{12}$, $R_{13}$, and $R_{14}$ each independently comprise a hydrogen atom, a fluorine atom, a chlorine atom, a substituted or unsubstituted C1-C10 alkyl group, or a substituted or unsubstituted C1-C10 alkoxy group.

Optionally, $R_{11}$, $R_{12}$, $R_{13}$, and $R_{14}$ each independently comprise a hydrogen atom, a fluorine atom, a chlorine atom, a substituted or unsubstituted C1-C3 alkyl group, or a substituted or unsubstituted C1-C3 alkoxy group.

Further optionally, $R_{11}$, $R_{12}$, $R_{13}$, and $R_{14}$ each independently comprise a hydrogen atom, a fluorine atom, a chlorine atom, a methyl group, a fluoromethyl group, a methoxy group, or a perfluoromethoxy group.

In some embodiments, the fluoropolymer has a polymerization degree n selected from any positive integer between 1000 and 30000, such as 1000, 2000, 3000, 4000, 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, or in a range consisting of any two of the aforementioned values.

Optionally, when substituted, the substituent may comprise one or more of cyano group (—CN), nitro group, sulfonic group, sulfonyl group, amide group, carboxyl group, ester group, or halogen atoms. Halogen atoms may comprise fluorine atoms, bromine atoms, etc., optionally fluorine atoms.

In some embodiments, the fluoropolymer comprises at least one of the compounds represented by Formula (AI-1) to Formula (AI-11), (AI-1)

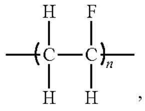
, (AI-2)

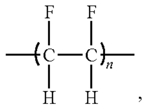
, (AI-3)

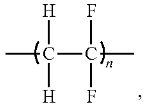
, (AI-4)

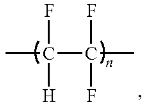
, (AI-5)

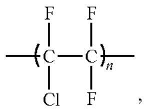
, (AI-6)

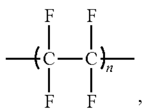
, (AI-7)

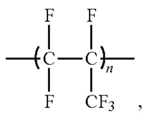
, (AI-8)

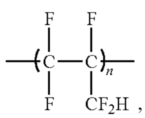
, (AI-9)

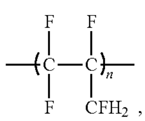
, (AI-10)

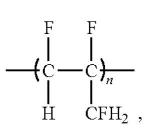
,

-continued (AI-11)

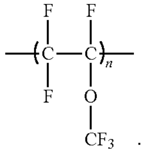
.

The compound represented by Formula (AII) is as follows:

Formula (AII)

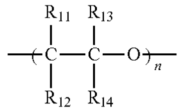
, in Formula (AII), $R_{11}$, $R_{12}$, $R_{13}$, and $R_{14}$ each independently comprise a hydrogen atom, a fluorine atom, a chlorine atom, a bromine atom, a substituted or unsubstituted C1-C3 alkyl group, or a substituted or unsubstituted C1-C3 alkoxy group, and at least one of $R_{11}$, $R_{12}$, $R_{13}$, and $R_{14}$ comprises a fluorine atom.

Optionally, $R_{11}$, $R_{12}$, $R_{13}$, and $R_{14}$ each independently comprise a hydrogen atom, a fluorine atom, a chlorine atom, a substituted or unsubstituted C1-C10 alkyl group, or a substituted or unsubstituted C1-C10 alkoxy group.

Optionally, $R_{11}$, $R_{12}$, $R_{13}$, and $R_{14}$ each independently comprise a hydrogen atom, a fluorine atom, a chlorine atom, a substituted or unsubstituted C1-C3 alkyl group, or a substituted or unsubstituted C1-C3 alkoxy group.

Further optionally, $R_{11}$, $R_{12}$, $R_{13}$, and $R_{14}$ each independently comprise a hydrogen atom, a fluorine atom, a chlorine atom, a methyl group, a fluoromethyl group, a methoxy group, or a perfluoromethoxy group.

In some embodiments, the fluoropolymer has a polymerization degree n selected from any positive integer between 1000 and 30000, such as 1000, 2000, 3000, 4000, 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, or in a range consisting of any two of the aforementioned values.

Optionally, when substituted, the substituent may comprise one or more of cyano group (—CN), nitro group, sulfonic group, sulfonyl group, amide group, carboxyl group, ester group, or halogen atoms. Halogen atoms may comprise fluorine atoms, bromine atoms, etc., optionally fluorine atoms.

In some embodiments, the fluoropolymer comprises at least one of the compounds represented by Formula (AII-1) to Formula (AII-5), Formula (AII-1)

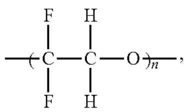
,

Formula (AII-2)

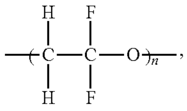
,

-continued

Formula (AII-3)

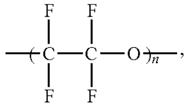

Formula (AII-4)

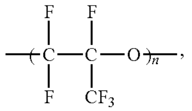

Formula (AII-5)

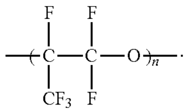

The compound represented by Formula (AIII) is as follows:

Formula (AIII)

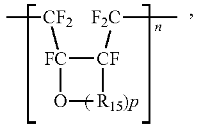

in Formula (AIII), $R_{15}$ comprises a single bond, a substituted or unsubstituted alkyl group; when substituted, the substituent comprises a fluorine atom.

Optionally, when substituted, the substituent may comprise one or more of cyano group (—CN), nitro group, sulfonic group, sulfonyl group, amide group, carboxyl group, ester group, or halogen atoms.

Optionally, $R_{15}$ comprises a single bond, a substituted or unsubstituted C1-C3 alkyl group.

In some embodiments, p is selected from any positive integer between 1 and 3, for example, 1, 2, or 3.

In some embodiments, the fluoropolymer has a polymerization degree n selected from any positive integer between 1000 and 30000, such as 1000, 2000, 3000, 4000, 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, or in a range consisting of any two of the aforementioned values.

In some embodiments, the fluoropolymer comprises at least one of the compounds represented by Formula (AIII-1) to Formula (AIII-3), Formula (AIII-1)

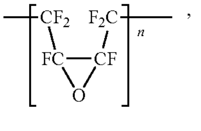

Formula (AIII)

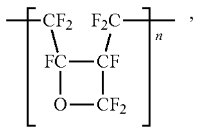

-continued

Formula (AIII-3)

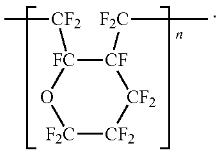

As an example, the fluoropolymer comprises one or more of polytetrafluoroethylene (PTFE), polyvinylidene fluoride (PVDF), fluorinated ethylene propylene copolymer (FEP), perfluoroalkoxy polymer (PFA), perfluoropolyether (PFPE), polyvinylidene fluoride-hexafluoropropylene copolymer (PVDF-HFP), polyvinylidene fluoride-trifluoroethylene copolymer (PVDF-TrFE), and perfluoro(1-butenyl vinyl ether) polymer (CYTOP).

Optionally, the fluoropolymer comprises one or more of polytetrafluoroethylene (PTFE), polyvinylidene fluoride (PVDF), fluorinated ethylene propylene copolymer (FEP), polyvinylidene fluoride-hexafluoropropylene copolymer (PVDF-HFP), and polyvinylidene fluoride-trifluoroethylene copolymer (PVDF-TrFE).

The above fluoropolymers can be derived from one or more of the following monomers: fluorocyclohexane, fluoroethylene, 1,2-difluoroethylene, vinylidene fluoride, trifluoroethylene, chlorotrifluoroethylene, tetrafluoroethylene, hexafluoropropylene, 3,3,3-trifluoropropene, trifluoropropene, tetrafluoropropene, pentafluoropropene, and the like. Optionally, the above fluoropolymers can be derived from at least two of the following monomers: fluorocyclohexane, fluoroethylene, 1,2-difluoroethylene, vinylidene fluoride, trifluoroethylene, chlorotrifluoroethylene, tetrafluoroethylene, hexafluoropropylene, 3,3,3-trifluoropropene, trifluoropropene, tetrafluoropropene, and pentafluoropropene.

In the embodiments of the present application, the polymer may be obtained by copolymerizing the aforementioned structural groups with a small amount of other types of structural groups (such as olefin compounds, ester monomers, nitrile monomers such as acrylonitrile, amide monomers such as acrylamide, acrylic acid, and the like). These monomers has relatively poor lyophilicity, when copolymerized with the monomers of the above fluoropolymers, it can improve the swelling rate and compression modulus of the adsorptive polymer.

In some embodiments, the adsorptive polymer has a molecular weight from $2\times10^5$ g/mol to $1.2\times10^6$ g/mol.

As an example, the molecular weight of the adsorptive polymer may be $2\times10^5$ g/mol, $5\times10^5$ g/mol, $8\times10^5$ g/mol, $1\times10^6$ g/mol, $1.2\times10^6$ g/mol, or in a range consisting of any two of the aforementioned values.

[Ether Polymers]

In some embodiments, the adsorptive polymer comprises an ether polymer.

In some embodiments, the ether polymer is made into a sheet-like structure; the sheet-like structure is subjected to dynamic frequency scanning tests at $(T_{m2}+20)$ ° C. to obtain the elastic modulus G'-loss modulus G" curve, the slope of which is $K_1$, and $1<K_1<\infty$; $T_{m2}$° C. represents the melting temperature of the ether polymer.

Specifically, the preparation process of the sheet-like structure is as follows: the ether polymer is vacuum-dried at 80° C. for 12 h. The dried ether polymer is then hot-pressed into sheets using a plate vulcanizing machine, with the hot-pressing temperature set to $(T_{m2}+20)$ ° C., the rolling thickness is 1-2 min, the rolling time is 2 min, and the pressure is 8 MPa. After rolling for 2 min, the sample is removed and placed on another vulcanizing machine of the same model for cold pressing, with a pressure of 10 MPa. A fixed-size polymer disc (sheet-like structure) can be obtained using a 25 mm diameter circular mold. As an example, the sheet-like structure can be a disc with a thickness of 1-2 mm and a diameter of 25 mm; it can also be made to the sample standard required by the testing equipment.

According to the conclusions of classical linear viscoelasticity, for polymers, especially linear polymers, the elastic modulus G'-loss modulus G" in the terminal region (the range of angular velocity approaching the maximum value) of the elastic modulus G'-loss modulus G" curve exhibits frequency dependence, and the longest chains of the polymer play a role in the viscoelastic behavior.

The specific steps for measuring the dynamic frequency scan are as follows: a TA-AR2000EX rotational rheometer (TA Instruments, USA) is used to perform the dynamic frequency scan test, with parallel plates having a diameter of 25 mm and a thickness of 0.9 mm. To ensure that the test is conducted in the linear viscoelastic region, the strain during the dynamic frequency scan test should be 2%, the test temperature is set to ($T_{m2}$+20) ° C., and the frequency scan range is 500 rad/s≤$w^2$≤0.05 rad/s, to obtain data from the lowest frequency region as much as possible.

The dynamic frequency scan test can characterize the degree of entanglement of molecular chains in the solid-phase melting (molten state) condition. Compared to linear structures or short branched structures, long-branched structures, networked structures, and low cross-linked structures have a higher degree of entanglement and will exhibit behavior deviating from linear terminal behavior, and thus ether polymers show solid-phase behavior. When the ether polymers of the present application meet the aforementioned range, they can further reduce the entanglement of molecular chain, which is beneficial for the diffusion of solvent molecules in the electrolytic solution between the molecular chains and helps form a gel-lie substance. Moreover, ether polymers still maintain a certain degree of molecular chain entanglement, which can effectively store electrolytic solution and enhance the infiltration to active materials. At higher temperatures, the gel-state substance can release solvent molecules to return to the polymer state, thus having a certain elasticity. This allows the ether polymer and the active material particles to have an interface with deformation capabilities, which can deform during the battery's charging and discharging cycles, reducing the risk of delamination of the internal structure of the electrode plate, enhancing the overall structural stability of the electrode plate, and improving the cycle performance of the battery cell.

In some embodiments, 1<$K_1$≤100; optionally, 1<$K_1$≤10. As an example, $K_1$ may be 1.01, 1.1, 2, 5, 10, 15, 20, 30, 50, 100, 200, 500, 1000, 5000, 10000, or in a range consisting of any two of the aforementioned values.

In some embodiments, the ether polymer has a glass transition temperature of $T_{g2}$° C., and −100≤$T_{g2}$≤50; optionally, −80≤$T_{g2}$<30. As an example, the glass transition temperature of the ether polymer may be −100° C., −90° C., −80° C., −70° C., −65° C., −60° C., −50° C., −45° C., −40° C., −35° C., −30° C., −25° C., −20° C., −15° C., −10° C., −5° C., 0° C., 5° C., 10° C., 15° C., 20° C., 25° C., 30° C., 40° C., 45° C., 50° C., or in a range consisting of any two of the aforementioned values. Ether polymers have a certain flexibility above their glass transition temperature, which can be beneficial for forming a gel-state substance, improving the infiltration effect on the electrode plate, and enhancing the cycle performance of the battery.

In some embodiments, the ether polymer comprises a compound as shown in Formula (BI), Formula (BI)

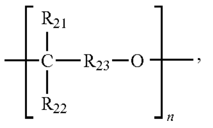

in which, $R_{21}$ and $R_{22}$ each independently comprise a hydrogen atom, a substituted or unsubstituted alkyl group, or a substituted or unsubstituted alkoxy group; $R_{23}$ comprises a single bond, a substituted or unsubstituted alkylene group.

Optionally, $R_{21}$ and $R_{22}$ each independently comprise a hydrogen atom, a substituted or unsubstituted C1-C10 alkyl group, or a substituted or unsubstituted C1-C10 alkoxy group.

Optionally, $R_{21}$ and $R_{22}$ each independently comprise a hydrogen atom, a substituted or unsubstituted C1-C3 alkyl group, or a substituted or unsubstituted C1-C3 alkoxy group.

Optionally, $R_{23}$ comprises a single bond, a substituted or unsubstituted C1-C10 alkylene group.

Optionally, $R_{23}$ comprises a single bond, a substituted or unsubstituted C1-C5 alkylene group.

As an example, the ether polymer comprises at least one of the compounds shown in Formula (BI-1) to Formula (BI-8).

Formula (BI-1)

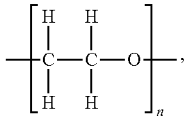

Formula (BI-2)

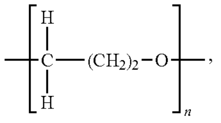

Formula (BI-3)

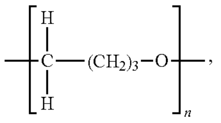

Formula (BI-4)

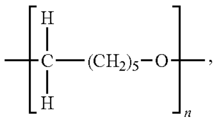

Formula (BI-5)

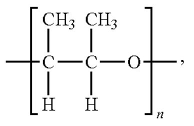

Formula (BI-6)

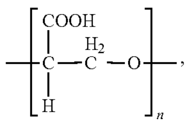

-continued

Formula (BI-7)

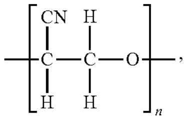

Formula (BI-8)

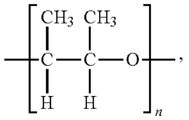

In some embodiments, the ether polymer comprises the compound shown in Formula (BII), Formula (BII)

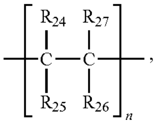

in which, $R_{24}$ to $R_{27}$ each independently comprise a hydrogen atom, a substituted or unsubstituted alkyl group, a substituted or unsubstituted alkoxy group or ether group, and at least one of $R_{24}$ to $R_{27}$ comprises a substituted or unsubstituted alkoxy group or ether group.

Optionally, $R_{24}$ to $R_{27}$ each independently comprise a hydrogen atom, a substituted or unsubstituted C1-C10 alkyl group, a substituted or unsubstituted C1-C10 alkoxy group or ether group.

Optionally, $R_{24}$ to $R_{27}$ each independently comprise a hydrogen atom, a substituted or unsubstituted C1-C3 alkyl group, a substituted or unsubstituted C1-C3 alkoxy group or ether group.

In some embodiments, the ether polymer comprises at least one of the compounds shown in Formula (BII-1) to Formula (BII-7), Formula (BII-1)

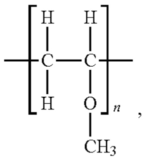

Formula (BII-2)

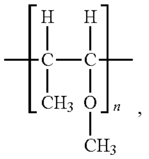

Formula (BII-3)

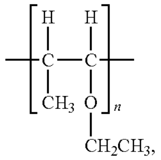

-continued

Formula (BII-4)

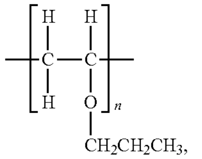

Formula (BII-5)

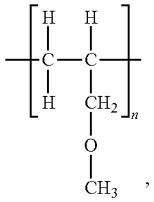

Formula (BII-6)

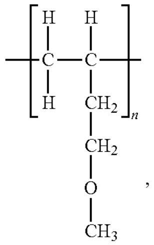

Formula (BII-7)

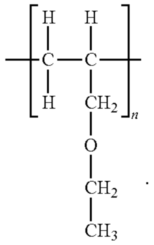

The above polymers are examples of the main structural groups only. In the embodiments of the present application, the polymers can also be copolymers obtained by combining the above structural groups with a small amount of other types of structural groups (such as olefin compounds, ester monomers, nitrile monomers such as acrylonitrile, amide monomers such as acrylamide, acrylic acid, and other compounds).

When the above groups are substituted, the substituents may comprise one or more of cyano group (—CN), nitro group, sulfonic group, sulfonyl group, amide group, carboxyl group, ester group, or halogen atoms. Halogen atoms may comprise at least one of fluorine or bromine atoms, optionally fluorine atoms.

In some embodiments, the ether polymer has a polymerization degree n selected from any positive integer between 1500 to 25000, for example, 1500, 2000, 3000, 4000, 5000, 6000, 7000, 8000, 9000, 10000, 11000, 12000, 13000, 14000, 15000, 16000, 17000, 18000, 19000, 20000, 21000, 22000, 23000, 24000, 25000, or in a range consisting of any two of the aforementioned values.

Optionally, the polymerization degree n of the ether polymer is a positive integer selected from 3000 to 18000.

In some embodiments, the molecular weight of the adsorptive polymer is from $2\times10^5$ g/mol to $1.2\times10^6$ g/mol. As an example, the molecular weight of the polymer may be $2\times10^5$ g/mol, $5\times10^5$ g/mol, $8\times10^5$ g/mol, $1\times10^6$ g/mol, $1.2\times10^6$ g/mol, or in a range consisting of any two of the aforementioned values.

[Ester Polymers]

In some embodiments, the adsorptive polymer comprises an ester polymer.

In some embodiments, the ester polymer is formed into a sheet-like structure; the sheet-like structure is subjected to dynamic frequency scanning tests at ($T_{m3}$+20) ° C. to obtain an elastic modulus G'-loss modulus G" curve, the slope of the elastic modulus G'-loss modulus G" curve is $K_2$, and $1<K_2\infty$; $T_{m3}$° C. represents the melting temperature of the ester polymer.

Specifically, the process for preparing the sheet-like structure is the same as that of the ether polymers and is not repeated here. When the ester polymers of the present application meet the above range, they can further reduce the entanglement of the molecular chain, which is beneficial for the diffusion of solvent molecules between the molecular chains in the electrolytic solution, and is conducive to the formation of a gel-state substance; moreover, the ester polymers still maintain a certain degree of molecular chain entanglement, which can effectively store electrolytic solution and improve the infiltration performance of active materials. At higher temperatures, the gel-state substance can release solvent molecules to return to the polymer state, thus having a certain elasticity. This allows the ester polymer and the active material particles to have an interface with deformation capabilities, which can deform during the battery's charging and discharging cycles, reducing the risk of delamination of the internal structure of the electrode plate, enhancing the overall structural stability of the electrode plate, and improving the cycle performance of the battery cell.

In some embodiments, $1<K_2\leq 100$; optionally, $1<K_2\leq 10$. As an example, $K_2$ may be 1.01, 1.1, 2, 5, 10, 15, 20, 30, 50, 100, 200, 500, 1000, 5000, 10000, or in a range consisting of any two of the aforementioned values.

In some embodiments, the ester polymer has a glass transition temperature of $T_{g3}$° C., and $-100\leq T_{g3}\leq 50$; optionally, $-80\leq T_{g3}\leq 30$. As an example, the glass transition temperature of the ester polymer may be −100° C., −90° C., −80° C., −70° C., −65° C., −60° C., −50° C., −45° C., −40° C., −35° C., −30° C., −25° C., −20° C., −15° C., −10° C., −5° C., 0° C., 5° C., 10° C., 15° C., 20° C., 25° C., 30° C., 40° C., 45° C., 50° C., or in a range consisting of any two of the aforementioned values. The ester polymer has a certain flexibility above the glass transition temperature, which can be beneficial for forming a gel-state substance, improving the infiltration effect on the electrode plate, and enhancing the cycle performance of the battery.

In some embodiments, the ester polymer comprises the compound shown in Formula (CI), Formula (CI)

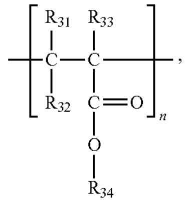

in which, $R_{31}$, $R_{32}$, and $R_{33}$ each independently comprise a hydrogen atom or a substituted or unsubstituted alkyl group; $R_{34}$ comprises a substituted or unsubstituted alkyl group or a substituted or unsubstituted hydroxyalkyl group.

Optionally, $R_{31}$, $R_{32}$, and $R_{33}$ each independently comprise a hydrogen atom or a substituted or unsubstituted C1-C10 alkyl group.

Optionally, $R_{31}$, $R_{32}$, and $R_{33}$ each independently comprise a hydrogen atom or a substituted or unsubstituted C1-C8 alkyl group.

In some embodiments, $R_{34}$ comprises a substituted or unsubstituted C1-C10 alkyl group or a substituted or unsubstituted C1-C10 hydroxyalkyl group.

In some embodiments, $R_{34}$ comprises a substituted or unsubstituted C1-C8 alkyl group or a substituted or unsubstituted C1-C8 hydroxyalkyl group.

In some embodiments, $R_{31}$ comprises a hydrogen atom or a substituted or unsubstituted methyl group.

In some embodiments, $R_{32}$ and $R_{33}$ each independently comprise a hydrogen atom.

As an example, the ester polymers comprises at least one of the compounds shown in Formula (CI-1) to Formula (CI-15), Formula (CI-1)

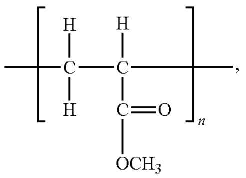

Formula (CI-2)

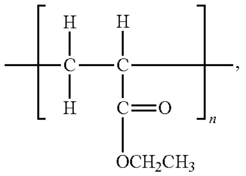

Formula (CI-3)

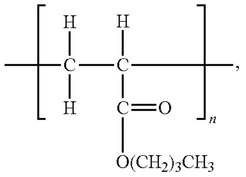

Formula (CI-4)

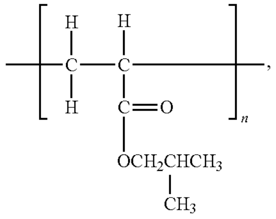

Formula (CI-5)

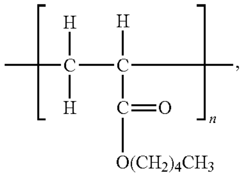

-continued

Formula (CI-6)

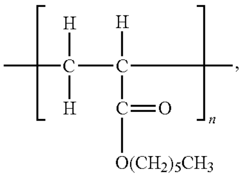

Formula (CI-7)

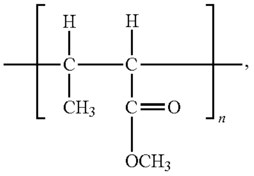

Formula (CI-8)

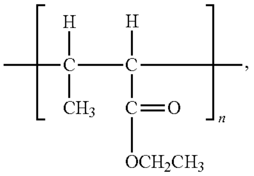

Formula (CI-9)

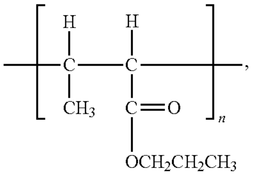

Formula (CI-10)

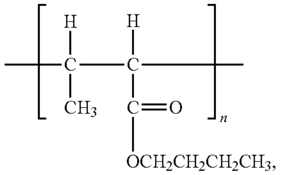

Formula (CI-11)

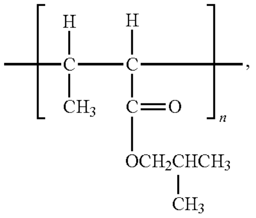

Formula (CI-12)

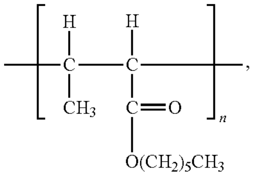

Formula (CI-13)

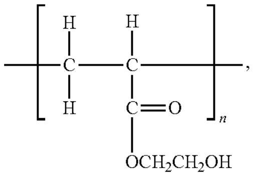

-continued

Formula (CI-14)

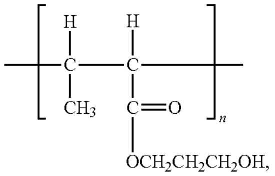

Formula (CI-15)

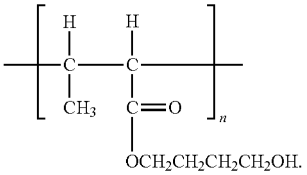

In some embodiments, the ester polymers comprise the compound shown in Formula (CII), Formula (CII)

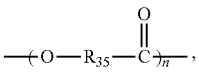

in which $R_{35}$ comprises a substituted or unsubstituted alkylene group.

Optionally, $R_{35}$ comprises a substituted or unsubstituted C1-C10 alkylene group.

Optionally, $R_{35}$ comprises a substituted or unsubstituted C2-C6 alkylene group.

Optionally, $R_{35}$ comprises a substituted or unsubstituted C2-C4 alkylene group.

As an example, the ester polymers comprise at least one of the compounds shown in Formula (CII-1) to Formula (CII-5), (CII-1)

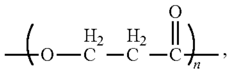

(CII-2)

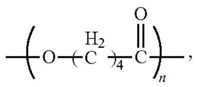

(CII-3)

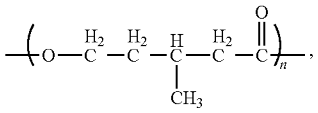

(CII-4)

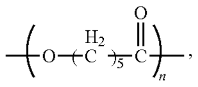

(CII-5)

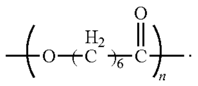

In some embodiments, the ester polymers comprise the compound shown in Formula (CIII), Formula (CIII)

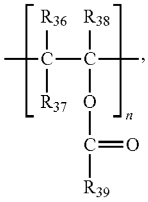

in which, $R_{36}$, $R_{37}$, and $R_{38}$ each independently comprise a hydrogen atom or a substituted or unsubstituted C1-C8 alkyl group; $R_{39}$ comprises a substituted or unsubstituted C1-C8 alkyl group;

optionally, $R_{36}$, $R_{37}$, and $R_{38}$ each independently comprise a hydrogen atom or a substituted or unsubstituted C1-C4 alkyl group.

As an example, the ester polymers comprise at least one of the compounds shown in Formula (CIII-1) to Formula (CIII-6)

(CIII-1)

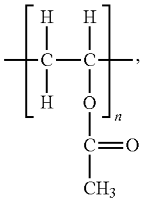

(CIII-2)

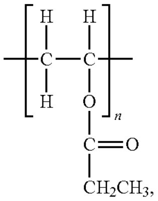

(CIII-3)

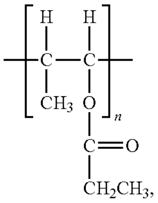

(CIII-4)

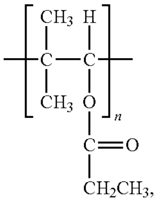

(CIII-5)

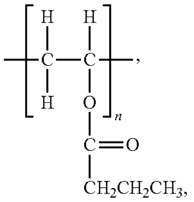

-continued (CIII-6)

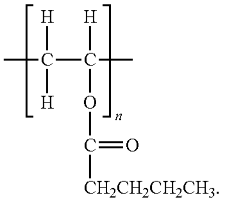

The above polymers are examples of the main structural groups of the molecular chain. In the embodiments of the present application, the adsorptive polymer can also be a copolymer of the above structural groups with a small amount of other types of structural groups (e.g., olefin compounds, ester monomers, nitrile monomers such as acrylonitrile, amide monomers such as acrylamide, acrylic acid, and the like).

When the above groups are substituted, the substituent may comprise one or more of cyano group (—CN), nitro group, sulfonic group, sulfonyl group, amide group, carboxyl group, ester group, or halogen atoms.

In some embodiments, the polymerization degree (n) of the ester polymers is a positive integer selected from 800 to 20000, for example, 800, 1000, 1500, 2000, 3000, 4000, 5000, 6000, 7000, 8000, 9000, 10000, 11000, 12000, 13000, 14000, 15000, 16000, 17000, 18000, 19000, 20000, or in a range consisting of any two of the above values.

In some embodiments, the polymerization degree n of the ester polymers is a positive integer selected from 1000 to 15000.

In some embodiments, the molecular weight of the adsorptive polymer is from $2\times10^5$ g/mol to $1.2\times10^6$ g/mol.

As an example, the molecular weight of the adsorptive polymer may be $2\times10^5$ g/mol, $5\times10^5$ g/mol, $8\times10^5$ g/mol, $1\times10^6$ g/mol, $1.2\times10^6$ g/mol, or in a range consisting of any two of the above values.

[Aldehyde-Ketone Polymers]

In some embodiments, the adsorptive polymer comprises an aldehyde-ketone polymer.

In some embodiments, the aldehyde-ketone polymer is formed into a sheet-like structure; the sheet-like structure is subjected to a dynamic frequency scanning test at $(T_{m4}+20)$ ° C. to obtain an elastic modulus G'-loss modulus G" curve, the slope of the elastic modulus G'-loss modulus G" curve is $K_3$, and $0.8\leq K_3<\infty$; $T_{m4}$° C. represents the melting temperature of the aldehyde-ketone polymer.

Specifically, the process for preparing the sheet-like structure is the same as that of the ether polymers and is not repeated here. When the aldehyde-ketone polymers of the present application meet the above range, they can further reduce the entanglement of the molecular chain, which is beneficial for the diffusion of solvent molecules between the molecular chains in the electrolytic solution, and is conducive to the formation of a gel-state substance; moreover, the aldehyde-ketone polymers still maintain a certain degree of molecular chain entanglement, which can effectively store electrolytic solution and improve the infiltration performance of active materials. At higher temperatures, the gel-state substance can release solvent molecules to return to the polymer state, thus having a certain elasticity. This allows the aldehyde-ketone polymer and the active material particles to have an interface with deformation capabilities, which can deform during the battery's charging and discharging cycles, reducing the risk of delamination of the internal structure of the electrode plate, enhancing the overall structural stability of the electrode plate, and improving the cycle performance of the battery cell.

In some embodiments, $0.8 \leq K_3 \leq 100$; optionally, $0.8 \leq K_3 \leq 10$. As an example, $K_3$ may be 0.8, 0.85, 0.9, 1, 1.01, 1.1, 2, 5, 10, 15, 20, 30, 50, 100, 200, 500, 1000, 5000, 10000, or in a range consisting of any two of the above values.

In some embodiments, the aldehyde-ketone polymer has glass transition temperature of $T_g4$° C., and $-100 \leq T_g4 \leq 50$; optionally, $-80 \leq T_g4 \leq 30$. As an example, the glass transition temperature of the aldehyde-ketone polymer may be −100° C., −90° C., −80° C., −70° C., −65° C., −60° C., −50° C., −45° C., −40° C., −35° C., −30° C., −25° C., −20° C., −15° C., −10° C., −5° C., 0° C., 5° C., 10° C., 15° C., 20° C., 25° C., 30° C., 40° C., 45° C., 50° C., or in a range consisting of any two of the above values. The aldehyde-ketone polymer has a certain flexibility above the glass transition temperature, which can be beneficial for the formation of gel-state substances, improving the infiltration effect on the electrode plate, and enhancing the cycle performance of the battery.

In some embodiments, the aldehyde-ketone polymer comprises the compound shown in Formula (DI), Formula (DI)

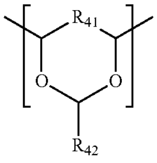

, in which, $R_{41}$ comprises a single bond, a substituted or unsubstituted C1-C6 alkylene group; $R_{42}$ comprises a hydrogen atom, a substituted or unsubstituted C1-C6 alkyl group.

Optionally, $R_{41}$ comprises a single bond, a substituted or unsubstituted C1-C2 alkylene group.

Optionally, $R_{42}$ comprises a hydrogen atom, a substituted or unsubstituted C1-C3 alkyl group.

In the embodiments of the present application, a single bond indicates that the group is absent, and the atoms on both sides of the group are connected by a single bond. For example, if $R_{41}$ is a single bond, it indicates that the carbon atoms on both sides of $R_{41}$ are connected in the form of a single bond.

As an example, the aldehyde-ketone polymers comprise at least one of the compounds shown in Formula (DI-1) to Formula (DI-6), Formula (DI-1)

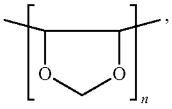

,

Formula (DI-2)

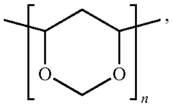

,

-continued

Formula (DI-3)

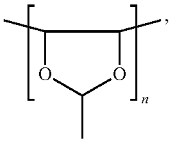

,

Formula (DI-4)

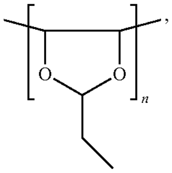

,

Formula (DI-5)

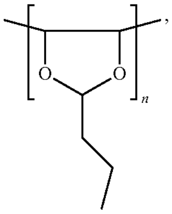

,

Formula (DI-6)

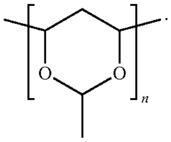

.

As an example, the aldehyde-ketone polymers comprise the compound shown in Formula (DII), Formula (DII)

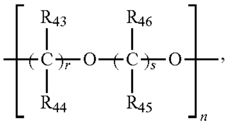

, in which, $R_{43}$ to $R_{46}$ each independently comprise a hydrogen atom, a hydroxyl group, a substituted or unsubstituted C1-C3 alkyl group, a substituted or unsubstituted C1-C3 hydroxyalkyl group, or a substituted or unsubstituted C1-C3 alkoxy group; r and s each independently are integers selected from 0 to 5, and at least one of r and s is a positive integer.

Optionally, $R_{43}$ to $R_{46}$ each independently comprise a hydrogen atom, a hydroxyl group, a substituted or unsubstituted C1-C3 alkyl group, a substituted or unsubstituted C1-C2 hydroxyalkyl group, or a substituted or unsubstituted C1-C2 alkoxy group.

In some embodiments, the aldehyde-ketone polymers comprise at least one of the compounds shown in Formula (DII-1) to Formula (DII-4), (DII-1)

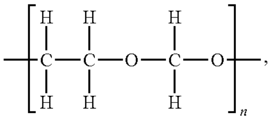

,

-continued (DII-2)

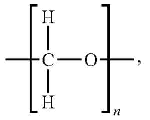

(DII-3)

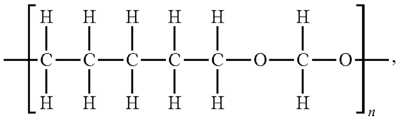

(DII-4)

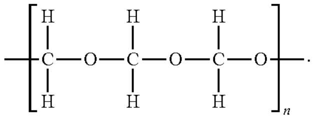

The aforementioned polymers are examples of the main chain structural groups only. In the embodiments of the present application, the polymers can also be copolymers obtained by combining the above structural groups with other types of structural groups (such as olefin compounds, enol compounds, acrylonitrile compounds, etc.).

When the aforementioned groups are substituted, the substituents may comprise one or more of cyano group (—CN), nitro group, sulfonic group, sulfonyl group, amide group, carboxyl group, ester group, or halogen atoms.

In some embodiments, the polymerization degree n of the aldehyde-ketone polymers is a positive integer selected from 500 to 15000, such as 500, 800, 1000, 1500, 2000, 3000, 4000, 5000, 6000, 7000, 8000, 9000, 10000, 11000, 12000, 13000, 14000, 15000, or in a range consisting of any two of the above values.

Optionally, the polymerization degree n of the aldehyde-ketone polymers is a positive integer selected from 500 to 10000.

In some embodiments, the molecular weight of the aldehyde-ketone polymers is from $1.2\times10^5$ g/mol to $1.2\times10^6$ g/mol.

As an example, the molecular weight of the aldehyde-ketone polymers may be $1.2\times10^5$ g/mol, $2\times10^5$ g/mol, $5\times10^5$ g/mol, $8\times10^5$ g/mol, $1\times10^6$ g/mol, $1.0\times10^6$ g/mol, $1.2\times10^6$ g/mol, or in a range consisting of any two of the above values.

The related parameters of the adsorptive polymers in the embodiments of the present application can be detected using the following methods:

the groups of the adsorptive polymers in the embodiments of the present application can be detected by infrared spectrophotometry IR. Specifically, the adsorptive polymer is tested by using a Thermo Nicolet Nexus 670 attenuated total reflection Fourier transform infrared spectrometer (FTIR-ATR), and then tested according to the standard GB/T6040-2002. The test range is: ATR method 600~4000 $cm^{-1}$; repeatability: ±2 $cm^{-1}$; resolution: better than 4 $cm^{-1}$; transmission depth: 0.2~0.6 μm.

The structure of the adsorptive polymers in the embodiments of the present application can be tested by nuclear magnetic resonance NMR. Specifically, 1H NMR and 13C NMR are performed on a Varian Mercury Plus-400 NMR spectrometer at a test temperature of 20° C., with TMS as the internal standard and $CDCl_3$ as the solvent, and the proton resonance frequency is 400 MHz.

The type of polymer monomers in the adsorptive polymers of the embodiments of the present application (particularly suitable for monomers that make up a smaller proportion in the polymer) can be determined by pyrolysis-gas chromatography-mass spectrometry. The specific test steps are as follows: accurately weigh 0.5 mg of the sample into a sample cup, fix it on the injection rod, and then load it into the pyrolyzer installed near the GC (gas chromatography) injection port; after the pyrolyzer temperature reaching the set temperature, press the injection button, and the sample cup quickly falls into the heart of the pyrolysis furnace through free fall; in an inert gas $N_2$ atmosphere, volatile components are instantly vaporized and carried into the gas chromatography column by the carrier gas for separation, and finally detected by a flame ionization detector FID or a mass spectrometer MS, thereby obtaining a gas chromatogram or a total ion chromatogram.

The molecular weight of the adsorptive polymers in the embodiments of the present application is known in the art and can be determined using common equipment and methods in the art. It can be tested by gel permeation chromatography GPC according to GB/T21863-2008. The specific test steps are as follows: taking an appropriate amount of the sample to be tested (ensuring that the sample concentration maintains an absorbance of 8%-12%), adding 20 ml of deionized water, and simultaneously ultrafiltrating for 5 min (53 KHz/120 W) to ensure complete dispersion of the sample; then, testing the sample according to the standard GB/T19077-2016/ISO 13320:2009.

[Positive Electrode Plate]

In some embodiments, the electrode plate comprises a positive electrode plate comprising a positive electrode current collector and a positive electrode film layer disposed on at least one side of the positive electrode current collector, wherein the positive electrode film layer comprises a positive electrode active material and an adsorptive polymer. In this case, the negative electrode plate may comprise a negative electrode current collector and a negative electrode film layer disposed on at least one side of the negative electrode current collector, the negative electrode film layer comprising a negative electrode active material and an adsorptive polymer. Alternatively, the negative electrode plate may comprise a negative electrode current collector and a negative electrode film layer disposed on at least one side of the negative electrode current collector, the negative electrode film layer comprising a negative electrode active material, i.e., not comprising an adsorptive polymer.

In other embodiments, the electrode assembly comprises a negative electrode plate comprising a negative electrode current collector and a negative electrode film layer disposed on at least one side of the negative electrode current collector, the negative electrode film layer comprising a negative electrode active material and an adsorptive polymer. In this case, the positive electrode film layer may comprise a positive electrode active material, i.e., not comprising an adsorptive polymer.

Further research has found that when both the positive and negative electrode film layers comprise an adsorptive polymer, the adsorptive polymer can not only improve the interface performance and structural stability of the positive electrode plate but also enhance the interface performance and structural stability of the negative electrode plate, thereby effectively improving the cycle performance of the battery cell.

In some embodiments, based on the total mass of the positive electrode film layer, the mass content of the adsorptive polymer is <5%; optionally, from 0.05% to 5%; further optionally, from 0.05% to 2%. When the mass content of the adsorptive polymer is within the above range, the adsorptive polymer can effectively improve the interface performance and structural stability of the positive electrode plate.

As an example, the mass content of the adsorptive polymer may be 0.05%, 0.08%, 0.10%, 0.11%, 0.12%, 0.15%, 0.16%, 0.18%, 0.20%, 0.22%, 0.25%, 0.28%, 0.30%, 0.32%, 0.35%, 0.38%, 0.40%, 0.42%, 0.45%, 0.48%, 0.50%, 0.55%, 0.58%, 0.60%, 0.70%, 0.80%, 0.90%, 0.95%, 1%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, or in a range consisting of any two of the above values.

In some embodiments, the coating weight of the adsorptive polymer is from 0.05 mg/1540.25 mm$^2$ to 5 mg/1540.25 mm$^2$, for example, 0.05 mg/1540.25 mm$^2$, 0.1 mg/1540.25 mm$^2$, 0.2 mg/1540.25 mm$^2$, 0.5 mg/1540.25 mm$^2$, 0.6 mg/1540.25 mm$^2$, 0.7 mg/1540.25 mm$^2$, 0.8 mg/1540.25 mm$^2$, 0.9 mg/1540.25 mm$^2$, 1.0 mg/1540.25 mm$^2$, 1.1 mg/1540.25 mm$^2$, 1.2 mg/1540.25 mm$^2$, 1.3 mg/1540.25 mm$^2$, 1.4 mg/1540.25 mm$^2$, 1.5 mg/1540.25 mm$^2$, 1.6 mg/1540.25 mm$^2$, 1.7 mg/1540.25 mm$^2$, 1.8 mg/1540.25 mm$^2$, 1.9 mg/1540.25 mm$^2$, 2.0 mg/1540.25 mm$^2$, 2.1 mg/1540.25 mm$^2$, 2.2 mg/1540.25 mm$^2$, 2.3 mg/1540.25 mm$^2$, 2.4 mg/1540.25 mm$^2$, 2.5 mg/1540.25 mm$^2$, 2.6 mg/1540.25 mm$^2$, 2.7 mg/1540.25 mm$^2$, 2.8 mg/1540.25 mm$^2$, 2.9 mg/1540.25 mm$^2$, 3.0 mg/1540.25 mm$^2$, 3.1 mg/1540.25 mm$^2$, 3.2 mg/1540.25 mm$^2$, 3.3 mg/1540.25 mm$^2$, 3.4 mg/1540.25 mm$^2$, 3.5 mg/1540.25 mm$^2$, 3.6 mg/1540.25 mm$^2$, 3.7 mg/1540.25 mm$^2$, 3.8 mg/1540.25 mm$^2$, 3.9 mg/1540.25 mm$^2$, 4.0 mg/1540.25 mm$^2$, 4.1 mg/1540.25 mm$^2$, 4.2 mg/1540.25 mm$^2$, 4.3 mg/1540.25 mm$^2$, 4.4 mg/1540.25 mm$^2$, 4.5 mg/1540.25 mm$^2$, 4.6 mg/1540.25 mm$^2$, 4.7 mg/1540.25 mm$^2$, 4.8 mg/1540.25 mm$^2$, 4.9 mg/1540.25 mm$^2$, 5.0 mg/1540.25 mm$^2$, or in a range consisting of any two of the above values. The coating weight of the adsorptive polymer refers to the coating weight in the single-sided positive electrode film layer of the positive electrode plate.

In the embodiments of the present application, the mass content of the polymer is as commonly understood in the art and can be detected using commonly known equipment and methods. For example, it can be tested according to JYTO14-1996 using thermal gravimetric analysis (TGA). Specifically, the mass loss of the electrode plate during heating is used to plot a mass-temperature curve, i.e., a TG curve. The corresponding weight loss at the decomposition temperature of the polymer is read as the total mass of the polymer in the electrode plate, from which the mass content and coating weight of the polymer are calculated. During the test, the following temperature rising procedure can be used under nitrogen atmosphere: 5° C./min, RT (room temperature) to 500° C.; 10° C./min, 500° C. to 600° C.; and 600° C. is maintained for 10 minutes to end the test.

The positive electrode film layer comprises a positive electrode active material, which can be any commonly known positive electrode active materials used in battery cells. As an example, the positive electrode active material may comprise lithium-based positive electrode active materials, such as olivine-type phosphate active materials and layered-structure positive electrode active materials.

As an example, the general formula for olivine-type phosphate active materials (phosphate compounds containing lithium) is: $Li_xA_yMe_aM_bP_{1-c}X_cY_z$, in which, $0 \leq x \leq 1.3$, $0 \leq y \leq 1.3$, and $0.9 \leq x+y \leq 1.3$; $0.9 \leq a \leq 1.5$, $0 \leq b \leq 0.5$, and $0.9 \leq a+b \leq 1.5$; $0 \leq c \leq 0.5$; $3 \leq z \leq 5$; A comprises one or more of Na, K, and Mg; Me comprises one or more of Mn, Fe, Co, and Ni; M comprises one or more of B, Mg, Al, Si, P, S, Ca, Sc, Ti, V, Cr, Cu, Zn, Sr, Y, Zr, Nb, Mo, Cd, Sn, Sb, Te, Ba, Ta, W, Yb, La, and Ce; X comprises one or more of S, Si, Cl, B, C, and N; Y comprises one or more of O and F. Specifically, olivine-type phosphate active materials comprise one or more of $LiFePO_4$, $LiMnPO_4$, $LiNiPO_4$, and $LiCoPO_4$.

As an example, the layered-structure positive electrode active materials comprise ternary, lithium/sodium nickelate, lithium/sodium cobaltate, lithium/sodium manganate, rich lithium layered materials, and rock salt phase layered materials, etc. The general formula for layered-structure positive electrode active materials is: $Li_xA_yNi_a Co_bMn_cM_{(1-a-b-c)}Y_z$, in which, $0 \leq x \leq 2.1$, $0 \leq y \leq 2.1$, and $0.9 \leq x+y \leq 2.1$; $0 \leq a \leq 1$, $0 \leq b \leq 1$, $0 \leq c \leq 1$, and $0.1 \leq a+b+c \leq 1$; $1.8 \leq z \leq 3.5$; A comprises one or more of Na, K, and Mg; M comprises one or more of B, Mg, Al, Si, P, S, Ca, Sc, Ti, V, Cr, Fe, Cu, Zn, Sr, Y, Zr, Nb, Mo, Cd, Sn, Sb, Te, Ba, Ta, W, Yb, La, and Ce; Y comprises one or more of O and F. Optionally, y=0. Specifically, layered structure positive electrode active materials may comprise one or more of lithium cobalt oxide (LCO), lithium nickel oxide (LNO), lithium manganese oxide (LMO), $LiNi_{1/3}$ $Co_{1/3}Mn_{1/3}O_2$ (NCM333), $LiNi_{0.5}$ $Co_{0.2}Mn_{0.3}O_2$(NCM523), $LiNi_{0.6}$ $Co_{0.2}Mn_{0.2}O_2$ (NCM622), $LiNi_{0.8}$ $Co_{0.1}Mn_{0.1}O_2$(NCM811), and NCA.

During the charging and discharging process of a single battery cell, active ions such as Li undergo intercalation and consumption, and the molar content of Li varies at different discharging states. In the embodiments of the present application, when listing positive electrode active materials, the molar content of Li refers to the initial state of the material, i.e., the state before feeding. When the positive electrode active material is applied in a battery system and undergoes charging and discharging cycles, the molar content of Li may change.

In the embodiments of the present application, the molar content of oxygen (O) is only a theoretical value, and lattice oxygen release can cause changes in the molar content of oxygen. Actually, the molar content of oxygen (O) may fluctuate.

In the embodiments of the present application, the modified compound may be modified by doping or coating. Doping modification may involve adding doping elements, such as transition metals, to the compound, while coating modification may involve surface coating with materials such as carbon, i.e., forming a carbon coating layer on the outer surface of the particles.

In some embodiments, based on the total mass of the positive electrode film layer, the mass content of the positive electrode active material is from 80% to 99.9%, optionally from 90% to 99%. When the mass content of the positive electrode active material is within the above range, it is beneficial for improving the energy density of the single battery cell.

In some embodiments, the positive electrode current collector has two surfaces opposite each other in their own thickness direction, and the positive electrode film layer is provided on either or both of the two opposite surfaces of the positive electrode current collector.

In some embodiments, the positive electrode current collector may be a metal foil or a composite current collector. As an example of a metal foil, an aluminum foil or an aluminum alloy foil may be used. The composite current collector may comprise a polymer material base layer and a metallic material layer formed on at least one surface of the polymer material base layer. As an example, the metallic material may comprise one or more of aluminum, aluminum alloy, nickel, nickel alloy, titanium, titanium alloy, silver, and silver alloy. As an example, the polymer material base layer may comprise one or more of polypropylene (PP), polyethylene terephthalate (PET), polybutylene terephthalate (PBT), polystyrene (PS), and polyethylene (PE).

In some embodiments, the positive electrode film layer may further comprise a conductive agent for positive electrode. The present application does not specifically limit the type of the conductive agent for positive electrode, and as examples, the conductive agent for positive electrode comprises one or more of superconducting carbon, conductive graphite, acetylene black, carbon black, Ketjen black, carbon dots, carbon nanotubes, graphene, and carbon nanofibers. In some embodiments, the mass percent of the conductive agent for positive electrode is 5 wt % or less, based on the total weight of the positive electrode film layer.

In some embodiments, the positive electrode film layer may further comprise a binder for positive electrode. The present application does not specifically limit the type of the binder for positive electrode, and as an example, the binder for positive electrode may comprise one or more of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluoro-containing acrylate-based resin. In some embodiments, the mass percent of the binder for positive electrode is 5 wt % or less, based on the total weight of the positive electrode film layer. Compared to the crystallinity of the fluoropolymers in the present application, the binder for positive electrode has a higher crystallinity.

The positive electrode film layer is usually formed by applying a positive electrode slurry to a positive electrode current collector, drying, and cold-pressing. The positive electrode slurry is usually formed by dispersing the positive electrode active material, the adsorptive polymer, the optional conductive agent, the optional binder, and any other components in a solvent and stirring uniformly. The solvent may be N-methylpyrrolidone (NMP), but is not limited thereto. Of course, the preparation of the positive electrode plate is not limited to the above method and can also employ the preparation methods mentioned earlier.

[Negative Electrode Plate]

In some embodiments, the electrode plate comprises a negative electrode plate comprising a negative electrode current collector and a negative electrode film layer disposed on at least one side of the negative electrode current collector, wherein the negative electrode film layer comprises a negative electrode active material and an adsorptive polymer.

In some embodiments, based on the total mass of the negative electrode film layer, the mass content of the adsorptive polymer is ≤6%; optionally, ≤5%; optionally, from 0.05% to 5%. When the mass content of the adsorptive polymer is within the above range, the adsorptive polymer can effectively improve the interface performance and structural stability of the negative electrode plate.

As an example, the mass content of the adsorptive polymer may be 0.05%, 0.08%, 0.10%, 0.11%, 0.12%, 0.15%, 0.16%, 0.18%, 0.20%, 0.22%, 0.25%, 0.28%, 0.30%, 0.32%, 0.35%, 0.38%, 0.40%, 0.42%, 0.45%, 0.48%, 0.50%, 0.55%, 0.58%, 0.60%, 0.70%, 0.80%, 0.90%, 0.95%, 1%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3.0%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, or in a range consisting of any two of the above values.

In some embodiments, the coating weight of the adsorptive polymer is from 0.5 mg/1540.25 $mm^2$ to 5 mg/1540.25 $mm^2$, for example, 0.5 mg/1540.25 $mm^2$, 0.6 mg/1540.25 $mm^2$, 0.7 mg/1540.25 $mm^2$, 0.8 mg/1540.25 $mm^2$, 0.9 mg/1540.25 $mm^2$, 1.0 mg/1540.25 $mm^2$, 1.1 mg/1540.25 $mm^2$, 1.2 mg/1540.25 $mm^2$, 1.3 mg/1540.25 $mm^2$, 1.4 mg/1540.25 $mm^2$, 1.5 mg/1540.25 $mm^2$, 1.6 mg/1540.25 $mm^2$, 1.7 mg/1540.25 $mm^2$, 1.8 mg/1540.25 $mm^2$, 1.9 mg/1540.25 $mm^2$, 2.0 mg/1540.25 $mm^2$, 2.1 mg/1540.25 $mm^2$, 2.2 mg/1540.25 $mm^2$, 2.3 mg/1540.25 $mm^2$, 2.4 mg/1540.25 $mm^2$, 2.5 mg/1540.25 $mm^2$, 2.6 mg/1540.25 $mm^2$, 2.7 mg/1540.25 $mm^2$, 2.8 mg/1540.25 $mm^2$, 2.9 mg/1540.25 $mm^2$, 3.0 mg/1540.25 $mm^2$, 3.1 mg/1540.25 $mm^2$, 3.2 mg/1540.25 $mm^2$, 3.3 mg/1540.25 $mm^2$, 3.4 mg/1540.25 $mm^2$, 3.5 mg/1540.25 $mm^2$, 3.6 mg/1540.25 $mm^2$, 3.7 mg/1540.25 $mm^2$, 3.8 mg/1540.25 $mm^2$, 3.9 mg/1540.25 $mm^2$, 4.0 mg/1540.25 $mm^2$, 4.1 mg/1540.25 $mm^2$, 4.2 mg/1540.25 $mm^2$, 4.3 mg/1540.25 $mm^2$, 4.4 mg/1540.25 $mm^2$, 4.5 mg/1540.25 $mm^2$, 4.6 mg/1540.25 $mm^2$, 4.7 mg/1540.25 $mm^2$, 4.8 mg/1540.25 $mm^2$, 4.9 mg/1540.25 $mm^2$, 5.0 mg/1540.25 $mm^2$, or in a range consisting of any two of the above values. The coating weight of the adsorptive polymer refers to the coating weight in the single-sided negative electrode film layer of the negative electrode plate.

The negative electrode active material may be a negative electrode active material known in the art for use in a battery cell. As an example, the negative electrode active material comprises, but is not limited to, at least one of natural graphite, artificial graphite, soft carbon, hard carbon, silicon-based material, tin-based material, or lithium titanate. The silicon-based material may comprise at least one of elemental silicon, a silicon oxide, a silicon carbon composite, a silicon nitrogen composite, or a silicon alloy material. The tin-based materials may comprise at least one of elemental tin, a tin oxide, or a tin alloy material.

In some embodiments, the negative electrode current collector has two surfaces opposite each other in their own thickness direction, and the negative electrode film layer is provided on either or both of the two opposite surfaces of the negative electrode current collector.

In some embodiments, the negative electrode film layer may optionally comprise a conductive agent for negative electrode. In the present application, the type of the conductive agent for negative electrode is not particularly limited and, as an example, the conductive agent for negative electrode may comprise at least one of superconducting carbon, conductive graphite, acetylene black, carbon black, Ketjen black, carbon dots, carbon nanotubes, graphene, or carbon nanofibers. In some embodiments, the mass percent of the conductive agent for negative electrode is ≤5 wt %, based on the total weight of the negative electrode film layer.

In some embodiments, the negative electrode film layer may further optionally comprise a binder for negative electrode. In the present application, the type of the binder for negative electrode is not particularly limited and, as an example, the binder for negative electrode may comprise at least one of styrene-butadiene rubber (SBR), water-soluble unsaturated resin SR-1B, aqueous acrylic resins (e.g., polyacrylic acid PAA, polymethacrylic acid PMAA, polyacrylic acid sodium salt PAAS), polyacrylamide (PAM), polyvinyl alcohol (PVA), sodium alginate (SA), or carboxymethyl chitosan (CMCS). In some embodiments, the mass percent of the binder for negative electrode is ≤5 wt %, based on the total weight of the negative electrode film layer.

In some embodiments, the negative electrode film layer may optionally comprise other additives. As an example, the other additives may comprise thickeners, e.g., sodium carboxymethyl cellulose (CMC), and PTC thermistor material, etc. In some embodiments, the mass percent of the other additive is ≤2 wt %, based on the total weight of the negative electrode film layer.

In some embodiments, the negative electrode current collector may be a metal foil or a composite current collector. As an example of a metal foil, a copper foil may be used. The composite current collector may comprise a polymer material base layer and a metallic material layer formed on at least one surface of the polymer material base layer. As an example, the metallic material may comprise at least one of copper, copper alloy, nickel, nickel alloy, titanium, titanium alloy, silver, or silver alloy. As an example, the polymer material base layer may comprise at least one of polypropylene (PP), polyethylene terephthalate (PET), polybutylene terephthalate (PBT), polystyrene (PS), or polyethylene (PE).

The negative electrode film layer is usually made by applying a negative electrode slurry to the negative electrode current collector followed by drying and cold pressing. The negative electrode slurry is usually formed by dispersing the negative electrode active material, the adsorptive polymer, the optional conductive agent, the optional binder, and any other optional additives in a solvent and stirring uniformly. The solvent may be N-methylpyrrolidone (NMP) or deionized water, but is not limited thereto. Of course, the preparation of the negative electrode plate is not limited to the above method and can also employ the preparation methods mentioned earlier.

The negative electrode plate does not exclude other additional functional layers than the negative electrode film layer. For example, in some embodiments, the negative electrode plate described in the present application further comprises a conductive primer (e.g. being composed of a conductive agent and a binder) sandwiched between the negative electrode current collector and the negative electrode film and disposed on the surface of the negative electrode current collector. In some embodiments, the negative electrode plate of the present application further comprises a protective layer covering the surface of the negative electrode film layer.

Battery Cell

In a second aspect, the present application further provides a battery cell. The battery cell comprise a positive electrode plate as described in any embodiment of the first aspect of the present application, which can effectively improve the cycle performance of the battery cell.

[Separator]

In some embodiments, the battery cell comprises a separator.

In some embodiments, the separator comprises a substrate.

In some embodiments, the separator comprises a substrate and a coating disposed on at least one surface of the substrate.

There is no particular limitation on the type of the substrate in the embodiments of the present application. The substrate may be any known substrate with good chemical and mechanical stability, such as glass fibers, a non-woven fabric, polyethylene, polypropylene, and polyvinylidene fluoride. The substrate may be a single-layer thin film or a multi-layer composite thin film. When the substrate is a multi-layer composite thin film, materials of various layers may be the same or different.

In some embodiments, the coating may further comprise a heat-resistant filler. Furthermore, the heat-resistant filler may comprise at least one of inorganic particles or organic particles.

In some embodiments, the decomposition temperature of the heat-resistant filler may be 200° C. or higher, thereby the heat-resistant filler can have good thermal stability and be less prone to decomposition, thereby further enhancing the heat resistance of the separator.

Inorganic particles have the characteristics of high thermal stability and being less prone to decomposition. Optionally, the inorganic particles may comprise at least one of inorganic particles with a dielectric constant of 5 or more, inorganic particles having ionic conductivity but not storing ions, or inorganic particles that can undergo electrochemical reactions.

Optionally, the inorganic particles with a dielectric constant of 5 or more comprise at least one of boehmite, alumina, zinc oxide, silicon oxide, titanium oxide, zirconium oxide, barium oxide, calcium oxide, magnesium oxide, nickel oxide, tin oxide, cerium oxide, yttrium oxide, hafnium oxide, aluminum hydroxide, magnesium hydroxide, silicon carbide, boron carbide, aluminum nitride, silicon nitride, boron nitride, magnesium fluoride, calcium fluoride, barium fluoride, barium sulphate, magnesium aluminum silicate, lithium magnesium silicate, sodium magnesium silicate, bentonite, hectorite, zirconium titanate, barium titanate, $Pb(Zr,Ti)O_3$ (abbreviated as PZT), $Pb_{1-m}La_mZr_{1-n}Ti_nO_3$ (abbreviated as PLZT, 0<m<1, 0<n<1), $Pb(Mg_3Nb_{2/3})O_3$—$PbTiO_3$ (abbreviated as PMN-PT), or their respective modified inorganic particles. Optionally, the modification of the respective inorganic particles may be chemical modification and/or physical modification. The chemical modification includes coupling agent modification (e.g., by silane coupling agent, titanate coupling agent, etc.), surfactant modification, polymer grafting modification, and the like. The physical modification may be mechanical force dispersion, ultrasonic dispersion, high-energy treatment and the like. The modification treatment can reduce the agglomeration of the inorganic particles; furthermore, the modification of the inorganic particles by selecting coupling agents and surface active materials with specific functional groups can also help to improve the infiltrating performance of the coating to the electrolytic solution and improve the adhesion of the coating to the substrate.

Optionally, the inorganic particles having ionic conductivity but not storing ions comprise one or more of $Li_3PO_4$, lithium titanium phosphate $Li_{x1}Ti_{y1}(PO_4)_3$, lithium titanium aluminum phosphate $Li_{x2}Al_{y2}Ti_{z1}(PO_4)_3$, $(LiAlTiP)_{x3}O_{y3}$-type glass, lithium lanthanum titanate $Li_{x4}La_{y4}TiO_3$, lithium germanium thiophosphate $Li_{x5}Ge_{y5}P_{z2}S_w$, lithium nitride $Li_{x6}N_{y6}$, $SiS_2$-type glass $Li_{x7}Si_{y7}S_{z3}$, and $P_2S_5$-type glass $Li_{x8}P_{y8}S_{z4}$, in which 0<x1<2, 0<y1<3, 0<x2<2, 0<y2<1, 0<z1<3, 0<x3<4, 0<y3<13, 0<x4<2, 0<y4<3, 0<x5<4, 0<y5<1, 0<z2<1, 0<w<5, 0<x6<4, 0<y6<2, 0<x7<3, 0<y7<2, 0<z3<4, 0<x8<3, 0<y8<3, 0<z4<7. Thereby, it is possible to further enhance the ionic transport properties of the separator.

Organic particles have the characteristics of good thermal stability and being less prone to decomposition, which can enhance the heat resistance of the separator. At the same time, when the internal temperature of the battery cell reaches the melting point of the organic particles due to overcharge abuse, thermal abuse, etc., the organic particles can also melt and be absorbed into the micropores of the substrate due to capillary action, thus playing a role in pore closure and circuit breaking. This is beneficial for ensuring that the battery cell has high safety performance.

In some embodiments, the organic particles comprise but are not limited to, at least one of polyethylene particles, polypropylene particles, polystyrene particles, melamine resin particles, phenolic resin particles, polyester particles (e.g., polyethylene terephthalate, polyethylene naphthalate, polybutylene terephthalate), polyimide particles, polyamide-imide particles, polyarylamide particles, polyphenylene sulfide particles, polysulfone particles, polyethersulfone particles, polyetheretherketone particles, polyaryleneetherketone particles, and copolymers of butyl acrylate and methyl methacrylate (e.g., crosslinked polymers of butyl acrylate and methyl methacrylate).

In some embodiments, the coating further comprises a binder. The present application does not particularly limit the type of binder and any known material with good binding properties can be selected. As an example, the binder comprises at least one of water-soluble acrylic resins (e.g., acrylate, methacrylate, sodium acrylate homopolymers or copolymers with other monomers), polyvinyl alcohol, isobutylene-maleic anhydride copolymers, and polyacrylamide.

Optionally, the content of the binder in the coating is less than 30%, based on the mass of the coating.

[Electrolytic Solution]

In some embodiments, the battery cell comprises an electrolytic solution.

During the charging and discharging process of the battery cell, active ions repeatedly intercalate into and deintercalate back and forth between the positive electrode plate and the negative electrode plate, and the electrolytic solution plays the role of conducting active ions between the positive electrode plate and the negative electrode plate. The present application has no particular limitation on the type of the electrolytic solution, which may be selected according to actual needs.

The electrolytic solution comprises an electrolyte salt and a solvent. The types of the electrolyte salt and the solvent are not specifically limited and can be selected according to actual needs.

As an example, the electrolyte salt may comprise, but is not limited to, at least one of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bisfluorosulfonimide (LiFSI), lithium bis(trifluoromethylsulfonyl)imide (LiTFSI), lithium trifluoromethane sulfonate (LiTFS), lithium difluorooxalate borate (LiDFOB), lithium dioxalate borate (LiBOB), lithium difluorophosphate ($LiPO_2F_2$), lithium difluorodioxalate phosphate (LiDFOP) or lithium tetrafluorooxalate phosphate (LiTFOP).

As an example, the solvent may comprise, but is not limited to, at least one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) or diethyl sulfone (ESE).

In some embodiments, the electrolytic solution may further optionally comprise additives. For example, the additives may comprise negative electrode film-forming additives, and may comprise positive electrode film-forming additives, and yet may comprise additives that can improve certain performances of batteries, for example, additives that improve battery overcharge performance of batteries, additives that improve high-temperature performance of batteries, and additives that improve low-temperature power performance of batteries.

In some embodiments, the positive electrode plate, the separator, and the negative electrode plate may be made into an electrode assembly by a winding process or a stacking process.

In some embodiments, the battery cell may comprise an outer package. The outer package may be used to encapsulate the electrode assembly and electrolytic solution.

In some embodiments, the outer package of the battery cell may be a hard case, such as a hard plastic case, an aluminum case, a steel case, and the like. The outer package of the battery cell may also be a soft package, such as a pouch-type soft package. A material of the soft bag can be plastic, such as at least one of polypropylene (PP), polybutylene terephthalate (PBT), and polybutylene succinate (PBS).

The shape of the battery cell is not particularly limited in the present application, and it may be cylindrical, square, rectangular or any other shape. FIG. 1 is a schematic diagram of a battery cell 5 of a rectangular structure as an example.

Figure 2:
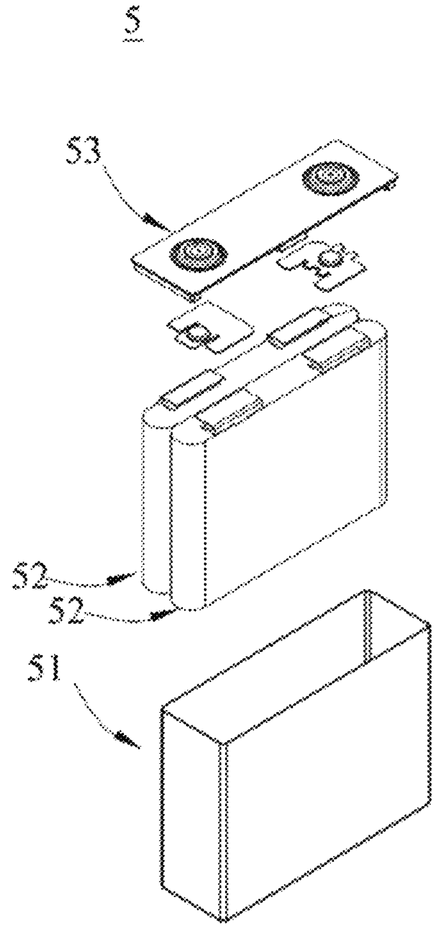
FIG. 2 is an exploded view of a battery cell according to the embodiment of the present application as shown in FIG. 1.

In some embodiments, as shown in FIG. 2, the outer package may include a casing 51 and a cover plate 53, wherein the casing 51 may include a bottom plate and side plates connected to the bottom plate, and the bottom plate and the side plates are enclosed to form an accommodating cavity. The casing 51 has an opening communicating with the accommodating cavity, and the cover plate 53 is used to cover the opening to close the accommodating cavity. A positive electrode plate, a separator, and a negative electrode plate may be made into an electrode assembly 52 by a winding process or a stacking process. The electrode assembly 52 is packaged in the accommodating cavity, and the electrolytic solution is infiltrated in the electrode assembly 52. The number of electrode assemblies 52 contained in the battery cell 5 may be one or more, and may be adjusted according to requirements.

The method for preparing the battery cell of the present application is well-known. In some embodiments, the positive electrode plate, the separator, the negative electrode plate, and the electrolytic solution may be assembled to form the battery cell. As an example, the positive electrode plate, the separator, and the negative electrode plate may form an electrode assembly through a winding or stacking process, the electrode assembly is placed in an outer package and dried, then the electrolytic solution is injected, followed by vacuum packaging, standing, formation, shaping, and other processes, thereby obtaining the battery cell.

In some embodiments, the battery cells according to the present application can be assembled into a battery module, and the number of battery cells contained in the battery module can be one or more, and the specific number can be adjusted according to application and capacity of the battery module.

Figure 3:
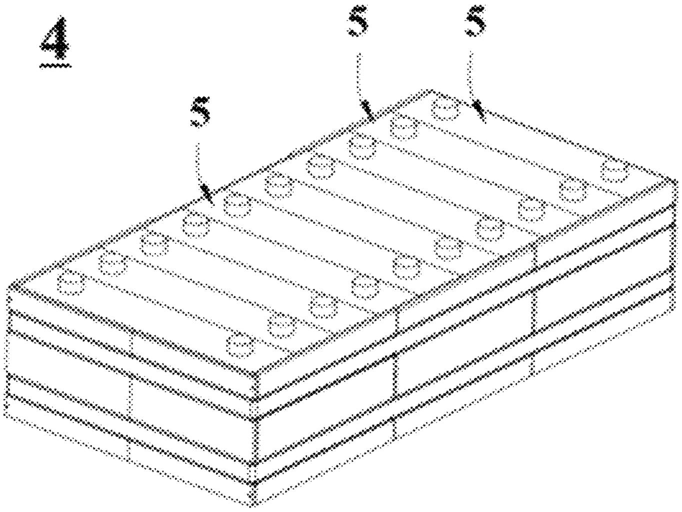
FIG. 3 is a schematic diagram of a battery module according to an embodiment of the present application.

FIG. 3 is a schematic diagram of the battery module as an example. As shown in FIG. 3, in the battery module 4, a plurality of battery cells 5 may be arranged in sequence along the longitudinal direction of the battery module 4. Certainly, they can also be arranged in any other manner. Furthermore, a plurality of battery cells 5 can be fixed with fasteners.

Optionally, the battery module 4 may further include a housing having an accommodating space in which a plurality of battery cells 5 are accommodated.

In some embodiments, the above-mentioned battery modules can also be assembled into a battery pack, and the number of battery modules included in the battery pack can be adjusted according to the application and capacity of the battery pack.

Both the battery module 4 and the battery pack may be used as examples of the batteries of the present application.

Figure 4:
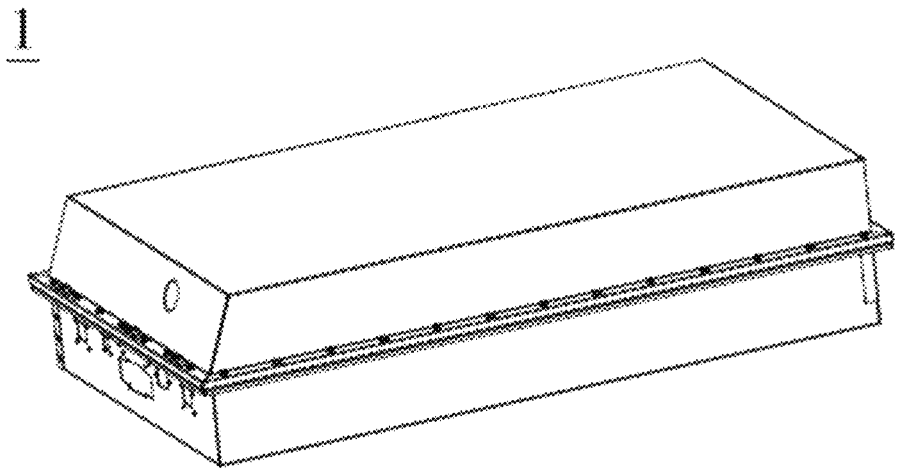
FIG. 4 is a schematic diagram of a battery pack according to an embodiment of the present application.
Figure 5:
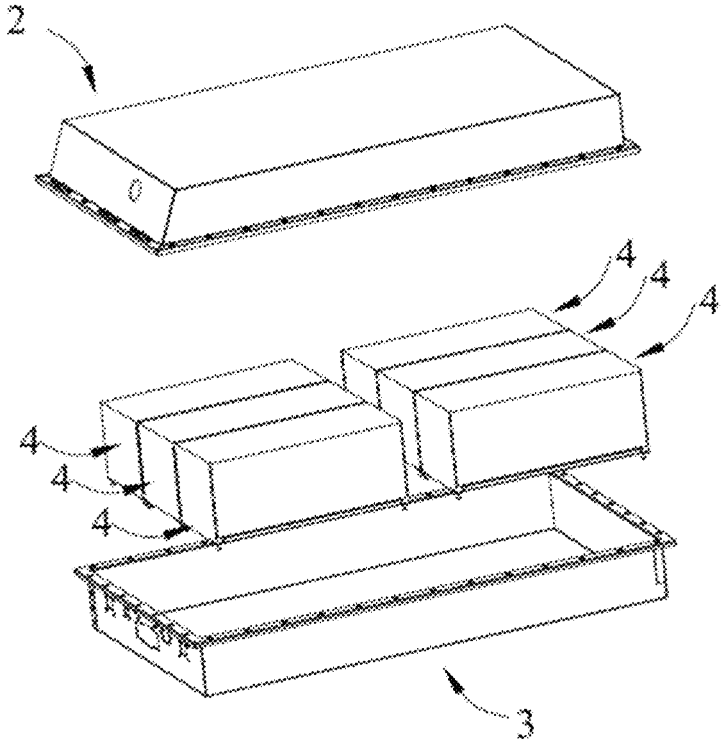
FIG. 5 is an exploded view of the battery pack according to the embodiment of the present application as shown in FIG. 4.

FIGS. 4 and 5 are schematic diagrams of the battery pack 1 as an example. As shown in FIGS. 4 and 5, the battery pack 1 may include a battery case and a plurality of battery modules 4 provided in the battery case. The battery box includes an upper case body 2 and a lower case body 3, and the upper case body 2 is used to cover the lower case body 3 to form a closed space for accommodating the battery modules 4. A plurality of battery modules 4 may be arranged in the battery case in any manner.

Electrical Device

A third aspect of the present application provides an electrical device comprising at least one of the battery cell, the battery module, or the battery pack according to the present application. The battery cell, the battery module or the battery pack can be used as a power source of the electrical device, and can also be used as an energy storage unit of the electrical device. The electrical device can be, but is not limited to, a mobile device (e.g., a mobile phone, a notebook computer, and the like), an electric vehicle (e.g., a pure electric vehicle, a hybrid electric vehicle, a plug-in hybrid electric vehicle, an electric bicycle, an electric scooter, an electric golf vehicle, an electric truck and the like), an electric train, a ship, a satellite, an energy storage system, and the like. In some embodiments, the battery cell comprises an injection hole for injecting the electrolytic solution; when the battery cell is applied to an electrical device, the injection hole is located at the bottom of the battery cell along the vertical direction. Since the amount of free electrolytic solution within the battery cell is very little or even none, setting the injection hole at the bottom of the battery cell along the vertical direction can also enhance the use reliability of the battery cell, thereby improving the use reliability of the electrical device.

Figure 6:
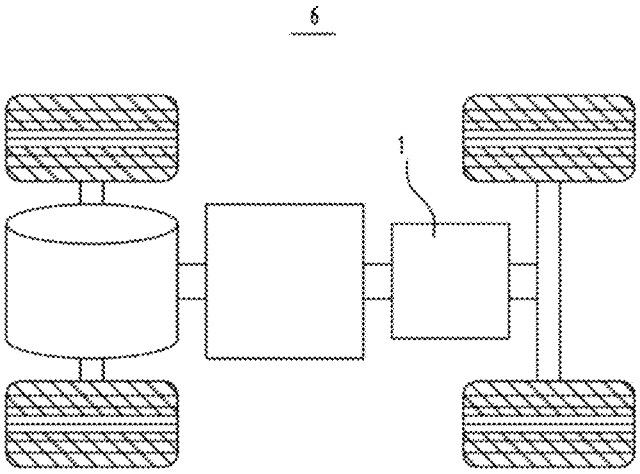
FIG. 6 is a schematic diagram of an electrical device according to an embodiment of the present application using the battery cell of the present application as power.

The electrical device can select a battery cell, a battery module or a battery pack according to its usage requirements. FIG. 6 is a schematic diagrams of an electrical device as an example. The electrical device is a pure electric vehicle, a hybrid electric vehicle, or a plug-in hybrid electric vehicle. In order to meet high power and high energy density requirements of the electrical device, a battery pack or a battery module can be used. As another example, the electrical device may be a mobile phone, a tablet computer, a notebook computer, and the like. The electric device is generally required to be light and thin, and a battery cell can be used as a power source.

EXAMPLES

Hereinafter, embodiments of the present application will be described. The embodiments described below are exemplary and are merely used to explain the present application, and are not to be construed as limiting the present application. If specific techniques or conditions are not specified in the examples, the techniques or conditions described in the literature of the filed or the product specification shall be used. If the manufacturer of the reagent or instrument used is not specified, it is a conventional product that is commercially available.

Example A1: Preparation of Lithium-Ion Battery (with Fluoropolymer as Adsorptive Polymer)

(1) Preparation of Positive Electrode Plate:

An aluminum foil was used as the positive electrode current collector.

The adsorptive polymer, the positive electrode active material, the conductive agent carbon black, and the binder such as polyvinylidene fluoride (PVDF) were added to N-methylpyrrolidone (NMP) to form a positive electrode slurry. The positive electrode slurry was applied on the aluminum foil and dried at 85° C. followed by cold-pressing, trimming, slicing and slitting, and then drying under vacuum at 85° C. for 4 h, to obtain a positive electrode plate. The mass ratio of the adsorptive polymer, $LiFePO_4$, carbon black, and PVDF in the positive electrode film layer was 0.5:96.8:2:0.7. PVDF as a binder had a crystallinity of 48%, a melting temperature of 164° C., and a glass transition temperature of 39° C.

(2) Preparation of Negative Electrode Plate:

A copper foil was used as the negative electrode current collector.

The adsorptive polymer, artificial graphite as a negative electrode active material, carbon black as a conductive agent, styrene butadiene rubber (SBR) as a binder, and sodium hydroxymethylcellulose (CMC) as a thickener were mixed in deionized water at a weight ratio of 2.5:94:0.5:2:1 to form a negative electrode slurry. The negative electrode slurry was applied on the copper foil and dried at 85° C. followed by cold-pressing, trimming, slicing and slitting, and drying under vacuum at 120° C. for 12 h, to obtain a negative electrode plate.

(3) Preparation of Electrolytic Solution

In an environment with a water content of less than 10 ppm, ethylene carbonate EC and methyl ethyl carbonate (EMC) as non-aqueous organic solvents were mixed at a volume ratio of 3:7 to obtain a solvent for electrolytic solution. Then, the mixed solvent was mixed with lithium salt $LiPF_6$ to prepare an electrolytic solution with a lithium salt concentration of 1 mol/L.

(4) Preparation of Lithium-Ion Battery:

Polyethylene film was used as a separator. The positive electrode plate, the separator, and the negative electrode place were stacked in order, so that the separator was located between the positive electrode plate and the negative electrode plate to provide isolation, and they were then wound up to obtain an electrode assembly; the electrode assembly was placed in a shell of an outer packaging shell and dried, followed by injecting the electrolytic solution. After vacuum sealing, steady standing, formation, shaping and other processes, a lithium-ion battery was obtained.

Examples A2 to A4

A lithium ion battery was prepared in a similar manner to that of Example A1, except that the types of adsorptive polymers in Examples A2 to A4 were adjusted.

Examples A5 to A6

A lithium ion battery was prepared in a similar manner to that of Example A1, except that the amounts of adsorptive polymers in Examples A5 to A6 were adjusted.

Examples A7 to A8

A lithium ion battery was prepared in a similar manner to that of Example A1, except that the types of adsorptive polymers in Examples A7 to A8 were adjusted.

Examples A9 to A15

A lithium ion battery was prepared in a similar manner to that of Example A1, except that the types and amounts of adsorptive polymers in Examples A9 to A15 were adjusted.

Comparative Example A1

A lithium-ion battery was prepared in a similar manner to that of Example A1, except that the positive electrode plate and the negative electrode plate in Comparative Example A1 did not comprise an adsorptive polymer.

(1) Preparation of Positive Electrode Plate:

An aluminum foil was used as the positive electrode current collector.

The positive electrode active material, the conductive agent carbon black, and the binder such as polyvinylidene fluoride (PVDF) were added to N-methylpyrrolidone (NMP) to form a positive electrode slurry. The positive electrode slurry was applied on the aluminum foil and dried at 85° C. followed by cold-pressing, trimming, slicing and slitting, and then drying under vacuum at 85° C. for 4 h, to obtain a positive electrode plate. The mass ratio of $LiFePO_4$, carbon black, and PVDF in the positive electrode film layer was 96.8:2:1.2.

(2) Preparation of Negative Electrode Plate:

A copper foil was used as the negative electrode current collector.

Artificial graphite as a negative electrode active material, carbon black as a conductive agent, styrene butadiene rubber (SBR) as a binder, and sodium hydroxymethylcellulose (CMC) as a thickener were mixed in deionized water at a weight ratio of 96.5:0.5:2:1 to form a negative electrode slurry. The negative electrode slurry was applied on the copper foil and dried at 85° C. followed by cold-pressing, trimming, slicing and slitting, and drying under vacuum at 120° C. for 12 h, to obtain a negative electrode plate.

Comparative Example A2

A lithium ion battery was prepared in a similar manner to that of Example A1, except that the type of polymer in Comparative Example A2 was adjusted.

Test Section (1) Test of Capacity Retention Rate of Lithium-Ion Battery

The working voltage of the battery was V1-V2, for $LiFePO_4$, V1=2.0V, V2=3.8V.

First, capacity of the lithium-ion batteries prepared from the examples and comparative examples were determined, and then C0 was obtained: discharging at 1 C to V1, standing for 5 minutes, then charging at a constant current of ⅓C to V2, followed by constant voltage charging at V2 until the current reached 0.05 C, standing for 5 minutes, and then discharging at 1 C to V1. The capacity at this point was recorded as C0.

Then, in a room temperature environment, the battery was charged at an equivalent 1.2 C step charge to V2 (charging at a constant current of 1.2 C to 0.5 C0 Ah, then at 0.87 C to 0.3 C0 Ah, and finally at ⅓C to V2), then charged at a constant voltage of V2 until the current reached 0.05 C, allowed to stand for 5 minutes, and then discharged at 0.33 C to V1. The obtained capacity was recorded as the initial capacity C0. The initial fixture force of the lithium-ion battery was set to 15000N. The above steps was repeated for the same battery and the discharging capacity Cn of the battery after the $n^{th}$ cycle was recorded. Then the capacity retention rate Pn of the battery after each cycle was calculated by Pn=Cn/C0*100%. By using 200 point values of P1, P2, . . . P200 as the vertical axis and the corresponding number of cycles as the horizontal axis, a dot plot showing capacity retention rate of the battery as a function of the number of cycles was obtained.

During this test, the first cycle corresponds to n=1, the second cycle corresponds to n=2, . . . the $200^{th}$ cycle corresponds to n=200. For example, the datum of capacity retention rate of each battery corresponding to Examples in Table 1 to Table 4 was the data measured after 200 cycles under the above test conditions, i.e., the value of P200. The testing procedures of comparative examples and other examples were the same as that described above.

(2) Test of Direct Current Impedance of Lithium-Ion Battery

The working voltage of the battery was V1-V2, for $LiFePO_4$, V1=2.0V, V2=3.8V.

First, capacity of the lithium-ion batteries prepared from the examples and comparative examples were determined, and then C0 was obtained: discharging at 1 C to V1, standing for 5 minutes, then charging at a constant current of ⅓C to V2, followed by constant voltage charging at V2 until the current reached 0.05 C, standing for 5 minutes, and then discharging at 1 C to V1. The capacity at this point was recorded as C0.

Then, in a room temperature environment, the battery was charged at an equivalent 1.2 C step charge to V2 (charging at a constant current of 1.2 C to 0.5 C0 Ah, then at 0.87 C to 0.3 C0 Ah, and finally at ⅓C to V2), then charged at a constant voltage of V2 until the current reached 0.05 C, allowed to stand for 5 minutes, and then discharged at 0.33 C to V1.

Each of the above-mentioned lithium-ion batteries prepared in the examples and comparative examples was charged at an equivalent 1.2 C step charge to V2 (charging at a constant current of 1.2 C to 0.5 C0 Ah, then at 0.87 C to 0.3 C0 Ah, and finally at ⅓C to V2), then charged at a constant voltage of V2 until the current reached 0.05 C, allowed to stand for 5 minutes, and the voltage V3 was recorded. Subsequently, the battery was discharged at ⅓C for 30 seconds, and the voltage V2 was recorded. The internal resistance DCR1 of the battery after the first cycle was obtained by (V3−V2)/⅓ C. The above steps was repeated for the same battery and the internal resistance DCRn (n=1, 2, 3, . . . 200) of the battery after the $n^{th}$ cycle was recorded. By using 200 point values of the above DCR1, DCR2, DCR3, . . . DCR200 as the vertical axis and the corresponding number of cycles as the horizontal axis, a graph showing the discharging DCIR of the battery (corresponding to the polymers in the examples and the comparative examples) as a function of the number of cycles was obtained.

During this test, the first cycle corresponds to n=1, the second cycle corresponds to n=2, . . . the $200^{th}$ cycle corresponds to n=200. For example, the internal resistance increase ratio of the battery of the examples being equal to (DCRn-DCR1)/DCR1*100% was shown in Table 1 to Table 4. The testing procedures of comparative examples and other examples were the same as that described above.

The data in Table 1 to Table 4 were the data measured after 200 cycles under the above test conditions.

TABLE 1

| Items | Fluoropolymer: Monomer 1 | Fluoropolymer: Monomer 2 | Fluoropolymer: Monomer 3 | Fluoropolymer: Crystallinity $X_C$ % | Fluoropolymer: Melting temperature Tm(° C.) | Fluoropolymer: Glass transition temperature Tg(° C.) | Fluoropolymer: Molecular weight (g/mol) | Fluoropolymer: Precipitation value $m_1/n$ | Fluoropolymer: $m_2/n$ | Positive electrode plate Content of fluoropolymer % | Negative electrode plate Content of fluoropolymer % | Lithium-ion battery: Capacity retention rate % | Lithium-ion battery: DCIR % |
|---|---|---|---|---|---|---|---|---|---|---|---|---|---|
| Binder PVDF in positive electrode plate | 100% VDF | / | / | 48 | 164 | 39 | 800000 | 1.1 | 1.00 | / | / | / | / |
| Comparative Example A1 | / | / | / | / | / | / | / | / | / | 0 | 0 | 80 | 25 |
| Comparative Example A2 | 95% VDF | 5% TFE | / | 48 | 167 | 56 | 1300000 | 1.2 | 1.05 | 0.5 | 2.5 | 81 | 24 |
| Example A1 | 94% VDF | 6% HFP | / | 20 | 125 | 15 | 600000 | 15 | 1.02 | 0.5 | 2.5 | 86 | 14 |
| Example A2 | 87% VDF | 8% HFP | 5% TFE | 25 | 130 | 25 | 600000 | 12 | 1.00 | 0.5 | 2.5 | 87 | 13 |
| Example A3 | 75% VDF | 25% HFP | / | 11 | 85 | 8 | 650000 | 31 | 1.03 | 0.5 | 2.5 | 90 | 9 |
| Example A4 | 75% VDF | 22% HFP | 3% ethylene | 10 | 81 | 5 | 700000 | 30 | 1.03 | 0.5 | 2.5 | 90 | 12 |
| Example A5 | 90% VDF | 10% HFP | / | 18 | 91 | 15 | 800000 | 20.0 | 1.05 | 0.5 | 0 | 88 | 10 |
| Example A6 | 90% VDF | 10% HFP | / | 18 | 91 | 15 | 800000 | 18 | 1.05 | 0 | 2.5 | 88 | 10 |
| Example A7 | 88% VDF | 12% HFP | / | 8 | 85 | 10 | 750000 | 12 | 1.02 | 0.5 | 2.5 | 90 | 10 |
| Example A8 | 80% VDF | 15% HFP | 5% Sulfonic acid mono-substituted ethylene | 8 | 85 | 10 | 720000 | 12 | 1.02 | 0.5 | 2.5 | 90 | 10 |
| Example A9 | 89% VDF | 11% HFP | / | 8 | 85 | 10 | 750000 | 12 | 1.02 | 0.05 | 2.5 | 90 | 12 |
| Example A10 | 89% VDF | 11% HFP | / | 8 | 85 | 10 | 750000 | 12 | 1.02 | 1 | 2.5 | 90 | 15 |
| Example A11 | 89% VDF | 11% HFP | / | 8 | 85 | 10 | 750000 | 12 | 1.02 | 2 | 2.5 | 89 | 18 |
| Example A12 | 89% VDF | 11% HFP | / | 8 | 85 | 10 | 750000 | 12 | 1.02 | 0.5 | 0.05 | 84 | 17 |
| Example A13 | 89% VDF | 11% HFP | / | 8 | 85 | 10 | 750000 | 12 | 1.02 | 0.5 | 1 | 88 | 15 |
| Example A14 | 89% VDF | 11% HFP | / | 8 | 85 | 10 | 750000 | 12 | 1.02 | 0.5 | 2 | 89 | 12 |
| Example A15 | 89% VDF | 11% HFP | / | 8 | 85 | 10 | 750000 | 12 | 1.02 | 0.5 | 5 | 91 | 7 |

In Table 1, VDF represents vinylidene fluoride, HFP represents hexafluoropropylene; TFE represents tetrafluoroethylene, wherein 90% VDF refers to a molar percentage of VDF being 90% based on the total molar amount of VDF and HFP, and 10% FEP refers to a molar percentage of FEP being 10%. Due to changes in polymerization conditions (such as polymerization temperature and pressure), the properties of the polymer formed from the same type of monomers may vary, including changes in the glass transition temperature.

As can be seen from Table 1, compared to Comparative Example A1, the examples according to the present application add the polymer of the present application to the positive and/or negative electrode plates, showing improved cycle performance of lithium-ion batteries. Compared to Comparative Example A2, when the examples according to the present application meets of $3 \le m_1/n \le 35$, and $1.00 \le m_2/n \le 1.05$, the molecular chains tend to be loosely arranged with weaker intermolecular forces, and the adjacent molecular chains are easily separated, and chain segment movement is achieved through intermolecular rotation, forming a molecular chain structure with high flexibility. This structure can physically adsorb electrolytic solution on the surface of active material particles, creating a "locking" effect and improving the infiltration of the electrode plates by the electrolytic solution. In environments with elevated battery system temperature or under dry conditions with electrolytic solution depletion, it can elastically release the electrolytic solution, thereby enhancing the deformation ability of interface between the polymer and active material. During the battery's charging and discharging cycles, it can buffer the deformation of interface between the polymer and active material, improving the structural stability of the electrode plates and thus enhancing the battery's cycle performance.

Example B1: Preparation of Lithium-Ion Battery (with Ether Polymer as Adsorptive Polymer)

(1) Preparation of Positive Electrode Plate:

An aluminum foil was used as the positive electrode current collector.

The ether polymer, the positive electrode active material $LiFePO_4$, the conductive agent carbon black, and the binder such as polyvinylidene fluoride (PVDF) were added to N-methylpyrrolidone (NMP) at a mass ratio of 0.5:96.8:2:0.7 to form a positive electrode slurry. The positive electrode slurry was applied on the aluminum foil and dried at 85° C. followed by cold-pressing, trimming, slicing and slitting, and then drying under vacuum at 85° C. for 4 h, to obtain a positive electrode plate. PVDF as a binder had a crystallinity of 48%, a melting temperature of 164° C., and a glass transition temperature of 39° C.

(2) Preparation of Negative Electrode Plate:

A copper foil was used as the negative electrode current collector.

The ether polymer, artificial graphite as a negative electrode active material, carbon black as a conductive agent, styrene butadiene rubber (SBR) as a binder, and sodium hydroxymethylcellulose (CMC) as a thickener were mixed in deionized water at a weight ratio of 2.5:94:0.5:2:1 to form a negative electrode slurry. The negative electrode slurry was applied on the copper foil and dried at 85° C. followed by cold-pressing, trimming, slicing and slitting, and drying under vacuum at 120° C. for 12 h, to obtain a negative electrode plate.

(3) Preparation of Electrolytic Solution

In an environment with a water content of less than 10 ppm, ethylene carbonate EC and methyl ethyl carbonate (EMC) as non-aqueous organic solvents were mixed at a volume ratio of 3:7 to obtain an solvent for electrolytic solution. Then, the mixed solvent was mixed with lithium salt $LiPF_6$ to prepare an electrolytic solution with a lithium salt concentration of 1 mol/L.

(4) Preparation of Lithium-Ion Battery:

Polyethylene film was used as a separator. The positive electrode plate, the separator, and the negative electrode place were stacked in order, so that the separator was located between the positive electrode plate and the negative electrode plate to provide isolation, and they were then wound up to obtain an electrode assembly; the electrode assembly was placed in a shell of an outer packaging shell and dried, followed by injecting the electrolytic solution. After vacuum sealing, steady standing, formation, shaping and other processes, a lithium-ion battery was obtained.

Comparative Example B1

A lithium-ion battery was prepared in a similar manner to that of Example B1, except that the positive electrode plate in Comparative Example B1 did not comprise an ether polymer and the negative electrode plate in Comparative Example B1 did not comprise an ether polymer.

Comparative Example B2

A lithium ion battery was prepared in a similar manner to that of Example B1, except that the ether polymer in the positive electrode plate and the negative electrode plate of Comparative Example B2 was adjusted.

Examples B2 to B4

A lithium ion battery was prepared in a similar manner to that of Example B1, except that the ether polymers in the positive electrode plate and the negative electrode plate of Examples B2 to B4 were adjusted.

Example B5

A lithium ion battery was prepared in a similar manner to that of Example B1, except that the positive electrode plate of Example B5 comprised an ether polymer while the negative electrode plate of Example B5 did not comprise an ether polymer.

Examples B6 to B9

A lithium ion battery was prepared in a similar manner to that of Example B1, except that the amounts the ether polymer in the positive electrode plate in Examples B6 to B9 were adjusted.

Examples B10 to B12

A lithium ion battery was prepared in a similar manner to that of Example B1l, except that the amounts the ether polymer in the negative electrode plate in Examples B10 to B12 were adjusted.

The method for characterizing the performance of lithium-ion batteries was the same as the testing section above.

The performance test results of the lithium-ion batteries from the examples and comparative examples were shown in Table 2.

TABLE 2

| | Ether polymer | | | | | | | Positive electrode | Negative electrode plate | Lithium-ion battery | |
|---|---|---|---|---|---|---|---|---|---|---|---|
| Items | Monomer 1 | Monomer 2 | Glass transition temperature Tg(° C.) | Molecular weight (g/mol) | K | Precipitation value $m_1/n$ | $m_2/n$ | plate Content of ether polymer % | Content of ether polymer/% | Capacity retention rate % | DCIR % |
| Comparative Example B1 | | / | / | / | / | / | / | / | / | 80 | 25 |
| Comparative Example B2 | 100% Ethylene oxide | / | −67 | 400000 | 1.8 | 1.5 | 1.03 | 0.5 | 2.5 | 81 | 24 |
| Example B1 | 80% Ethylene oxide | 20% Oxirane-2-ethyl ester | −45 | 250000 | 1.2 | 12 | 1.03 | 0.5 | 2.5 | 87 | 13 |
| Example B2 | 90% Ethylene oxide | 10% Oxirane-2-carboxylic acid | −12 | 250000 | 1.1 | 7 | 1.03 | 0.5 | 2.5 | 85 | 15 |
| Example B3 | 88% Ethyl vinyl ether | 12% Vinyl acetate | 0 | 300000 | 1.6 | 15 | 1.03 | 0.5 | 2.5 | 84 | 16 |
| Example B4 | 100% Ethylene oxide | / | −65 | 200000 | 1.3 | 10 | 1.03 | 0.5 | 2.5 | 90 | 10 |
| Example B5 | 80% Ethylene oxide | 20% Oxirane-2-ethyl ester | −45 | 250000 | 1.2 | 12 | 1.03 | 0.5 | 0 | 85 | 18 |
| Example B6 | 80% Ethylene oxide | 20% Oxirane-2-ethyl ester | −45 | 250000 | 1.2 | 12 | 1.03 | 0 | 2.5 | 87 | 15 |
| Example B7 | 100% Ethylene oxide | / | −65 | 200000 | 1.3 | 10 | 1.02 | 0.1 | 2.5 | 88 | 13 |
| Example B8 | 100% Ethylene oxide | / | −65 | 200000 | 1.3 | 10 | 1.02 | 1.5 | 2.5 | 91 | 9 |
| Example B9 | 100% Ethylene oxide | / | −65 | 200000 | 1.3 | 10 | 1.02 | 2.0 | 2.5 | 87 | 14 |
| Example B10 | 100% Ethylene oxide | / | −65 | 200000 | 1.3 | 10 | 1.02 | 0.5 | 0.2 | 88 | 15 |
| Example B11 | 100% Ethylene oxide | / | −65 | 200000 | 1.3 | 10 | 1.02 | 0.5 | 5.0 | 92 | 8 |
| Example B12 | 100% Ethylene oxide | / | −65 | 200000 | 1.3 | 10 | 1.02 | 0.5 | 6.0 | 87 | 16 |

In Table 2, "100% ethylene oxide" refers to a mass percent of ethylene oxide being 100% based the total mass of monomer 1 and monomer 2.

"80% Ethylene oxide" refers to a mass percent of ethylene oxide being 80% based the total mass of monomer 1 and monomer 2; "20% oxirane-2-ethyl ester" refers to a mass percent of oxirane-2-ethyl ester being 20% based on the total mass of monomer 1 and monomer 2

As can be seen from Table 2, compared to Comparative Example B1, the examples according to the present application add the ether polymer of the present application to the positive and/or negative electrode plates, showing improved cycle performance of lithium-ion batteries. Compared to Comparative Example B2, when the examples according to the present application meets of $3 \le m_1/n \le 35$, and $1.00 \le m_2/n \le 1.05$, the molecular chains tend to be loosely arranged with weaker intermolecular forces, and the adjacent molecular chains are easily separated, and chain segment movement is achieved through intermolecular rotation, forming a molecular chain structure with high flexibility. This structure can physically adsorb electrolytic solution on the surface of active material particles, creating a "locking" effect and improving the infiltration of the electrode plates by the electrolytic solution. In environments with elevated battery system temperature or under dry conditions with electrolytic solution depletion, it can elastically release the electrolytic solution, thereby enhancing the deformation ability of interface between the polymer and active material. During the battery's charging and discharging cycles, it can buffer the deformation of interface between the polymer and active material, improving the structural stability of the electrode plates and thus enhancing the battery's cycle performance.

Example C1: Preparation of Lithium-Ion Battery (with Ester Polymer as Adsorptive Polymer)

(1) Preparation of Positive Electrode Plate:

An aluminum foil was used as the positive electrode current collector.

The ester polymer, the positive electrode active material $LiFePO_4$, the conductive agent carbon black, and the binder such as polyvinylidene fluoride (PVDF) were added to N-methylpyrrolidone (NMP) at a mass ratio of 0.5:96.8:2:0.7 to form a positive electrode slurry. The positive electrode slurry was applied on the aluminum foil and dried at 85° C. followed by cold-pressing, trimming, slicing and slitting, and then drying under vacuum at 85° C. for 4 h, to obtain a positive electrode plate. PVDF as a binder had a crystallinity of 48%, a melting temperature of 164° C., and a glass transition temperature of 39° C.

(2) Preparation of Negative Electrode Plate:

A copper foil was used as the negative electrode current collector.

The ester polymer, artificial graphite as a negative electrode active material, carbon black as a conductive agent, styrene butadiene rubber (SBR) as a binder, and sodium hydroxymethylcellulose (CMC) as a thickener were mixed in deionized water at a weight ratio of 2.5:94:0.5:2:1 to form a negative electrode slurry. The negative electrode slurry was applied on the copper foil and dried at 85° C. followed by cold-pressing, trimming, slicing and slitting, and drying under vacuum at 120° C. for 12 h, to obtain a negative electrode plate.

(3) Preparation of Electrolytic Solution

In an environment with a water content of less than 10 ppm, ethylene carbonate EC and methyl ethyl carbonate (EMC) as non-aqueous organic solvents were mixed at a volume ratio of 3:7 to obtain an solvent for electrolytic solution. Then, the mixed solvent was mixed with lithium salt $LiPF_6$ to prepare an electrolytic solution with a lithium salt concentration of 1 mol/L.

(4) Preparation of Lithium-Ion Battery:

Polyethylene film was used as a separator. The positive electrode plate, the separator, and the negative electrode place were stacked in order, so that the separator was located between the positive electrode plate and the negative electrode plate to provide isolation, and they were then wound up to obtain an electrode assembly; the electrode assembly was placed in a shell of an outer packaging shell and dried, followed by injecting the electrolytic solution. After vacuum sealing, steady standing, formation, shaping and other processes, a lithium-ion battery was obtained.

Comparative Example C1

A lithium-ion battery was prepared in a similar manner to that of Example C1, except that the positive electrode plate in Comparative Example C1 did not comprise an ester polymer and the negative electrode plate in Comparative Example C1 did not comprise an ester polymer.

Comparative Example C2

A lithium ion battery was prepared in a similar manner to that of Example C1, except that the ester polymer in the positive electrode plate and the negative electrode plate of Comparative Example C2 was adjusted.

Examples C2 to C4

A lithium ion battery was prepared in a similar manner to that of Example C1, except that the ester polymers in the positive electrode plate and the negative electrode plate of Examples C2 to C4 were adjusted.

Example C5

A lithium ion battery was prepared in a similar manner to that of Example C1, except that the positive electrode plate of Example C5 comprised an ester polymer while the negative electrode plate of Example B5 did not comprise an ester polymer.

Examples C6 to C9

A lithium ion battery was prepared in a similar manner to that of Example C1, except that the amounts the ester polymer in the positive electrode plate in Examples C6 to C9 were adjusted.

Examples C10 to C12

A lithium ion battery was prepared in a similar manner to that of Example C1, except that the amounts the ester polymer in the negative electrode plate in Examples C10 to C12 were adjusted.

The method for characterizing the performance of lithium-ion batteries was the same as the testing section above.

The performance test results of the lithium-ion batteries from the examples and comparative examples were shown in Table 3.

TABLE 3

| | Ester polymer | | | | | | | | Positive electrode plate | Negative electrode plate Content | Lithium-ion battery | |
|---|---|---|---|---|---|---|---|---|---|---|---|---|
| Items | Monomer 1 | Monomer 2 | Monomer 3 | Glass transition temperature | Molecular weight (g/mol) | K | Precipitation value $m_1/n$ | $m_2/n$ | Content of ester polymer % | of ester polymer/ % | Capacity retention rate % | DCIR % |
| Comparative Example C1 | / | / | / | / | / | / | / | / | / | / | 80 | 25 |
| Comparative Example C2 | 100% Methyl methacrylate | / | / | 100 | 500000 | 2 | 0 | 1 | 0.5 | 2.5 | 81 | 24 |
| Example C1 | 85% Vinyl acetate | 15% Ethylene | / | 0 | 180000 | 1.1 | 25 | 1.02 | 0.5 | 2.5 | 87 | 13 |
| Example C2 | 60% Methyl methacrylate | 35% Butyl acrylate | 5% Acrylonitrile | −10 | 350000 | 1.1 | 18 | 1.04 | 0.5 | 2.5 | 85 | 15 |
| Example C3 | 100% Cyclohexanolactone | / | / | −50 | 400000 | 1.8 | 15 | 1.04 | 0.5 | 2.5 | 84 | 16 |

TABLE 3-continued

| | Ester polymer | | | | | | | | Positive electrode plate | Negative electrode plate Content | Lithium-ion battery | |
|---|---|---|---|---|---|---|---|---|---|---|---|---|
| Items | Monomer 1 | Monomer 2 | Monomer 3 | Glass transition temper-ature | Molecular weight (g/mol) | K | Precip-itation value $m_1/n$ | $m_2/n$ | Content of ester polymer % | of ester polymer/ % | Capacity retention rate % | DCIR % |
| Example C4 | 100% Ethyl acrylate | / | / | −50 | 250000 | 1.4 | 20 | 1.05 | 0.5 | 2.5 | 90 | 10 |
| Example C5 | 85% Vinyl acetate | 15% Ethylene | / | 0 | 250000 | 1.1 | 25 | 1.05 | 0.5 | 0 | 85 | 18 |
| Example C6 | 85% Vinyl acetate | 15% Ethylene | / | 0 | 250000 | 1.1 | 25 | 1.05 | 0 | 2.5 | 87 | 15 |
| Example C7 | 100% Ethyl acrylate | / | | −50 | 250000 | 1.4 | 20 | 1.03 | 0.1 | 2.5 | 88 | 13 |
| Example C8 | 100% Ethyl acrylate | / | | −50 | 250000 | 1.4 | 20 | 1.03 | 1.5 | 2.5 | 91 | 9 |
| Example C9 | 100% Ethyl acrylate | / | / | −50 | 250000 | 1.4 | 20 | 1.03 | 2.0 | 2.5 | 87 | 14 |
| Example C10 | 100% Ethyl acrylate | / | / | −50 | 250000 | 1.4 | 20 | 1.03 | 0.5 | 0.2 | 88 | 15 |
| Example C11 | 100% Ethyl acrylate | / | / | −50 | 250000 | 1.4 | 20 | 1.03 | 0.5 | 5.0 | 92 | 8 |
| Example C12 | 100% Ethyl acrylate | / | / | −50 | 250000 | 1.4 | 20 | 1.03 | 0.5 | 6.0 | 87 | 16 |

In Table 3, "100% methyl methacrylate" means that the mass percent of methyl methacrylate is 100% based on the total mass of monomer 1, monomer 2 and monomer 3;

"85% vinyl acetate" means that the mass percent of vinyl acetate is 85% based on the total mass of monomer 1, monomer 2, and monomer 3; "15% ehthylene" means that the mass percent of ethylene is 15% based on the total mass of monomer 1, monomer 2, and monomer 3.

As can be seen from Table 3, compared to Comparative Example C1, the examples according to the present application add the ester polymer of the present application to the positive and/or negative electrode plates, showing improved cycle performance of lithium-ion batteries. Compared to Comparative Example C2, when the examples according to the present application meets of $3 \leq m_1/n \leq 35$, and $1.00 \leq m_2/n \leq 1.05$, the molecular chains tend to be loosely arranged with weaker intermolecular forces, and the adjacent molecular chains are easily separated, and chain segment movement is achieved through intermolecular rotation, forming a molecular chain structure with high flexibility. This structure can physically adsorb electrolytic solution on the surface of active material particles, creating a "locking" effect and improving the infiltration of the electrode plates by the electrolytic solution. In environments with elevated battery system temperature or under dry conditions with electrolytic solution depletion, it can elastically release the electrolytic solution, thereby enhancing the deformation ability of interface between the polymer and active material. During the battery's charging and discharging cycles, it can buffer the deformation of interface between the polymer and active material, improving the structural stability of the electrode plates and thus enhancing the battery's cycle performance.

Example D1: Preparation of Lithium-Ion Battery (with Aldehyde-Ketone Polymer as Adsorptive Polymer)

(1) Preparation of Positive Electrode Plate:

An aluminum foil was used as the positive electrode current collector.

The aldehyde-ketone polymer, the positive electrode active material $LiFePO_4$, the conductive agent carbon black, and the binder such as polyvinylidene fluoride (PVDF) were added to N-methylpyrrolidone (NMP) at a mass ratio of 0.5:96.8:2:0.7 to form a positive electrode slurry. The positive electrode slurry was applied on the aluminum foil and dried at 85° C. followed by cold-pressing, trimming, slicing and slitting, and then drying under vacuum at 85° C. for 4 h, to obtain a positive electrode plate. PVDF as a binder had a crystallinity of 48%, a melting temperature of 164° C., and a glass transition temperature of 39° C.

(2) Preparation of Negative Electrode Plate:

A copper foil was used as the negative electrode current collector.

The aldehyde-ketone polymer, artificial graphite as a negative electrode active material, carbon black as a conductive agent, styrene butadiene rubber (SBR) as a binder, and sodium hydroxymethylcellulose (CMC) as a thickener were mixed in deionized water at a weight ratio of 2.5:94:0.5:2:1 to form a negative electrode slurry. The negative electrode slurry was applied on the copper foil and dried at 85° C. followed by cold-pressing, trimming, slicing and slitting, and drying under vacuum at 120° C. for 12 h, to obtain a negative electrode plate.

(3) Preparation of Electrolytic Solution

In an environment with a water content of less than 10 ppm, ethylene carbonate EC and methyl ethyl carbonate (EMC) as non-aqueous organic solvents were mixed at a volume ratio of 3:7 to obtain an solvent for electrolytic solution. Then, the mixed solvent was mixed with lithium salt $LiPF_6$ to prepare an electrolytic solution with a lithium salt concentration of 1 mol/L.

(4) Preparation of Lithium-Ion Battery:

Polyethylene film was used as a separator. The positive electrode plate, the separator, and the negative electrode place were stacked in order, so that the separator was located between the positive electrode plate and the negative electrode plate to provide isolation, and they were then wound up to obtain an electrode assembly; the electrode assembly was placed in a shell of an outer packaging shell and dried, followed by injecting the electrolytic solution. After vacuum sealing, steady standing, formation, shaping and other processes, a lithium-ion battery was obtained.

Comparative Example D1

A lithium-ion battery was prepared in a similar manner to that of Example D1, except that the positive electrode plate in Comparative Example D1 did not comprise an aldehyde-ketone polymer and the negative electrode plate in Comparative Example D1 did not comprise an aldehyde-ketone polymer.

Comparative Example D2

A lithium ion battery was prepared in a similar manner to that of Example D1, except that the aldehyde-ketone polymer in the positive electrode plate and the negative electrode plate of Comparative Example B2 was adjusted.

Examples D2 to D4

A lithium ion battery was prepared in a similar manner to that of Example D1, except that the aldehyde-ketone polymers in the positive electrode plate and the negative electrode plate of Examples D2 to D4 were adjusted.

Example D5

A lithium ion battery was prepared in a similar manner to that of Example D1, except that the positive electrode plate of Example D5 comprised an aldehyde-ketone polymer while the negative electrode plate of Example D5 did not comprise an aldehyde-ketone polymer.

Examples D6 to D9

A lithium ion battery was prepared in a similar manner to that of Example D1, except that the amounts the aldehyde-ketone polymer in the positive electrode plate in Examples D6 to D9 were adjusted.

Examples D10 to D12

A lithium ion battery was prepared in a similar manner to that of Example D1, except that the amounts the aldehyde-ketone polymer in the negative electrode plate in Examples D10 to D12 were adjusted.

The method for characterizing the performance of lithium-ion batteries was the same as the testing section above.

The performance test results of the lithium-ion batteries from the examples and comparative examples were shown in Table 4.

TABLE 4

| | Aldehyde-ketone polymer | | | | | | | Positive electrode plate | Negative electrode plate | Lithium-ion battery | |
|---|---|---|---|---|---|---|---|---|---|---|---|
| Items | Monomer 1 | Monomer 2 | Glass transition temperature Tg(° C.) | Molecular weight (g/mol) | K | Precipitation value $m_1/n$ | $m_2/n$ | Content of aldehyde-ketone polymer % | Content of aldehyde-ketone polymer/% | Capacity retention rate % | DCIR % |
| Comparative Example 1 | / | / | / | / | / | / | / | 24.8% | 0.18 | 0.73 | / |
| Comparative Example 2 | 100% Formaldehyde | / | −30 | 200000 | 0.4 | 1.4 | 0.5 | 24.8% | 0.2 | 0.81 | 2.5 |
| Example 1 | 30% PVA polyvinyl alcohol | 70% Formaldehyde | 28 | 200000 | 12 | 0.8 | 0.5 | 24.8% | 0.52 | 2.10 | 2.5 |
| Example 2 | 20% PVA polyvinyl alcohol | 80% Butyraldehyde | 55 | 200000 | 7 | 0.9 | 0.5 | 24.8% | 0.45 | 2.02 | 2.5 |
| Example 3 | 100% Dioxolane | / | −38 | 180000 | 10 | 0.8 | 0.5 | 27.9% | 0.38 | 1.36 | 2.5 |
| Example 4 | 100% Trioxane | / | −53 | 180000 | 8 | 0.9 | 0.5 | 27.9% | 0.50 | 1.79 | 2.5 |
| Example 5 | 30% PVA polyvinyl alcohol | 70% Formaldehyde | 28 | 200000 | 12 | 0.8 | 0.5 | 24.8% | 0.52 | 2.10 | 0 |
| Example 6 | 30% PVA polyvinyl alcohol | 70% Formaldehyde | 28 | 200000 | 12 | 0.8 | 0 | 24.8% | 0.18 | 0.73 | 2.5 |
| Example 7 | 100% Trioxane | / | −53 | 180000 | 8 | 0.9 | 0.1 | 24.8% | 0.20 | 0.81 | 2.5 |
| Example 8 | 100% Trioxane | / | −53 | 180000 | 8 | 0.9 | 1.5 | 24.8% | 0.8 | 3.23 | 2.5 |
| Example 9 | 100% Trioxane | / | −53 | 180000 | 8 | 0.9 | 2.0 | 24.8% | 1.2 | 4.84 | 2.5 |

TABLE 4-continued

| | Aldehyde-ketone polymer | | | | | | | Positive electrode plate | Negative electrode plate | Lithium-ion battery | |
|---|---|---|---|---|---|---|---|---|---|---|---|
| Items | Monomer 1 | Monomer 2 | Glass transition temperature Tg(° C.) | Molecular weight (g/mol) | K | Precip-itation value $m_1/n$ | $m_2/n$ | Content of aldehyde-ketone polymer % | Content of aldehyde-ketone polymer/% | Capacity retention rate % | DCIR % |
| Example 10 | 100% Trioxane | / | −53 | 180000 | 8 | 0.9 | 0.5 | 24.8% | 0.50 | 1.79 | 0.2 |
| Example 11 | 100% Trioxane | / | −53 | 180000 | 8 | 0.9 | 0.5 | 24.8% | 0.50 | 1.79 | 5.0 |
| Example 12 | 100% Trioxane | / | −53 | 180000 | 8 | 0.9 | 0.5 | 24.8% | 0.50 | 1.79 | 6.0 |

In Table 4, "100% formaldehyde" means that the mass percent formaldehyde is 100% based on the total mass of monomer 1 and monomer 2.

"30% polyvinyl alcohol" means that the mass percent of polyvinyl alcohol is 30% based on the total mass of monomer 1 and monomer 2.

As can be seen from Table 4, compared to Comparative Example D1, the examples according to the present application add the aldehyde-ketone polymer of the present application to the positive and/or negative electrode plates, showing improved cycle performance of lithium-ion batteries. Compared to Comparative Example D2, when the examples according to the present application meets of $3 \le m_1/n \le 35$, and $1.00 \le m_2/n \le 1.05$, the molecular chains tend to be loosely arranged with weaker intermolecular forces, and the adjacent molecular chains are easily separated, and chain segment movement is achieved through intermolecular rotation, forming a molecular chain structure with high flexibility. This structure can physically adsorb electrolytic solution on the surface of active material particles, creating a "locking" effect and improving the infiltration of the electrode plates by the electrolytic solution. In environments with elevated battery system temperature or under dry conditions with electrolytic solution depletion, it can elastically release the electrolytic solution, thereby enhancing the deformation ability of interface between the polymer and active material. During the battery's charging and discharging cycles, it can buffer the deformation of interface between the polymer and active material, improving the structural stability of the electrode plates and thus enhancing the battery's cycle performance.

While the present application has been described with reference to preferred embodiments, various modifications may be made thereto and components therein may be replaced with equivalents without departing from the scope of the present application. In particular, the technical features mentioned in the various embodiments can be combined in any manner as long as there is no structural conflict. The present application is not limited to the specific embodiments disclosed herein, but includes all technical solutions falling within the scope of the claims.

What is claimed is:

1. An electrode plate comprising a current collector and a film layer disposed on at least one side of the current collector, the film layer comprising an active material and an adsorptive polymer, wherein:

a sedimentation capability of the adsorptive polymer characterized by $m_1/m$ satisfies: $3 \le m_1/m \le 35$, wherein $m_1$ represents a mass, in grams, of a first substance that includes a gel-state material obtained after a mixture of m grams of the adsorptive polymer and 15m grams of an electrolytic solution is subjected to a first processing, the electrolytic solution comprises dimethyl carbonate, ethyl methyl carbonate, vinylene carbonate, and lithium hexafluorophosphate in equal amounts by mass, a concentration of lithium hexafluorophosphate in the electrolytic solution is 1 mol/L, and the first processing comprises:

subjecting the mixture to a temperature of 45° C. for 60 hours and 25° C. for 24 hours or more; and then performing filtering on the mixture through a 200-mesh screen;

a defluidization capability of the adsorptive polymer characterized by $m_2/m$ satisfies: $1.00 \le m_2/m \le 1.05$, wherein $m_2$ represents a mass, in grams, of a second substance obtained after the mixture is subjected to both the first processing and a second processing, and the second processing comprises drying the first substance obtained from the first processing at 60° C. for 24 hours or more; and the adsorptive polymer comprises a fluoropolymer comprising at least one of the compounds shown in Formula (AII-1), Formula (AII-2), and Formula (AIII):

Formula (AII-1)

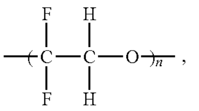

Formula (AII-2)

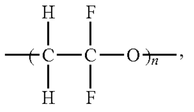

Formula (AIII)

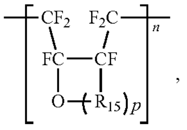

where in Formula (AIII), R15 comprises a single bond, a substituted or unsubstituted C1-C3 alkyl group; p is a positive integer selected from 1 to 3; and where in Formula (AII-1), Formula (AII-2), and Formula (AIII), n is a positive integer selected from 1000 to 30000.

2. The electrode plate according to claim 1, wherein $5 \le m_1/m \le 35$.

3. The electrode plate according to claim 1, wherein:

a mass percentage of the adsorptive polymer in the film layer is ≤5%; and/or an amount of the adsorptive polymer in the electrode plate is from 0.5 mg to 2 mg per 1540.25 $mm^2$ area on one side of the current collector.

4. The electrode plate according to claim 1, wherein a mass percentage of the adsorptive polymer in the film layer is from 0.05% to 5%.

5. The electrode plate according to claim 1, wherein:

a crystallinity, $Xc_1$%, of the fluoropolymer, as measured by differential scanning calorimetry satisfies $0<Xc_1\leq 30$; and a melting temperature $T_{m1}$° C. of the fluoropolymer satisfies $0<T_{m1}\leq 140$.

6. The electrode plate according to claim 5, wherein a glass transition temperature $T_{g1}$° C. of the fluoropolymer satisfies $-150\leq T_{g1}\leq 60$.

7. The electrode plate according to claim 1, wherein the fluoropolymer further comprises a compound shown in Formula (AI):

Formula (AI)

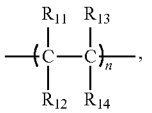

where in Formulas (AI), $R_{11}$, $R_{12}$, $R_{13}$, and $R_{14}$ each independently comprise a hydrogen atom, a fluorine atom, a chlorine atom, a bromine atom, a substituted or unsubstituted C1-C3 alkyl group, or a substituted or unsubstituted C1-C3 alkoxy group, and at least one of $R_{11}$, $R_{12}$, $R_{13}$, and $R_{14}$ comprises a fluorine atom, n is a positive integer selected from 1000 to 30000.

8. The electrode plate according to claim 1, wherein the adsorptive polymer comprises an ether polymer, which has a slope $K_1$ of an elastic modulus G'-loss modulus G" curve that is measured by subjecting a sheet-like structure formed of the ether polymer to dynamic frequency scanning tests at ($T_{m2}$+20° C.), and $1<K_1<\infty$, where $T_{m2}$° C. represents a melting temperature of the ether polymer.

9. The electrode plate according to claim 8, wherein the ether polymer comprises at least one of the compounds shown in Formula (BI) and Formula (BII):

Formula (BI)

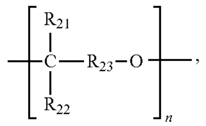

in which, $R_{21}$ and $R_{22}$ each independently comprise a hydrogen atom, a substituted or unsubstituted C1-C3 alkyl group, or a substituted or unsubstituted C1-C3 alkoxy group; $R_{23}$ comprises a substituted or unsubstituted C1-C5 alkylene group;

Formula (BII)

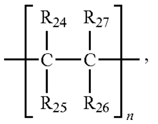

in which, $R_{24}$ to $R_{27}$ each independently comprise a hydrogen atom, a substituted or unsubstituted C1-C3 alkyl group, a substituted or unsubstituted C1-C3 alkoxy group or ether group, and at least one of $R_{24}$ to $R_{27}$ comprises a substituted or unsubstituted C1-C3 alkoxy group or ether group; and the ether polymer has a polymerization degree n selected from any positive integer between 1500 and 25000.

10. The electrode plate according to claim 1, wherein the adsorptive polymer comprises an ester polymer, which has a slope $K_2$ of an elastic modulus G'-loss modulus G" curve that is measured by subjecting a sheet-like structure formed of the ester polymer to dynamic frequency scanning tests at ($T_{m3}$+20° C.), and $1<K_2<\infty$, where $T_{m3}$° C. represents a melting temperature of the ester polymer.

11. The electrode plate according to claim 10, wherein a glass transition temperature $T_{g3}$° C. of the ester polymer satisfies $-100\leq T_{g3}\leq 50$.

12. The electrode plate according to claim 10, wherein the ester polymer comprises at least one of the compounds shown in Formula (CI) to Formula (CIII):

Formula (CI)

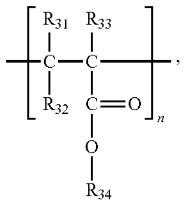

in which, $R_{31}$, $R_{32}$, and $R_{33}$ each independently comprise a hydrogen atom or a substituted or unsubstituted C1-C8 alkyl group; R34 comprises a substituted or unsubstituted C1-C8 alkyl group, or a substituted or unsubstituted C1-C8 hydroxyalkyl group;

Formula (CII)

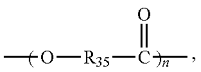

in which, $R_{35}$ comprises a substituted or unsubstituted C2-C6 alkylene group;

Formula (CIII)

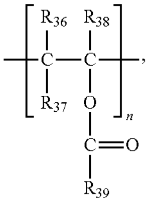

in which, $R_{36}$, $R_{37}$, and $R_{38}$ each independently comprise a hydrogen atom or a substituted or unsubstituted C1-C8 alkyl group; $R_{39}$ comprises a substituted or unsubstituted C1-C8 alkyl group; and the ester polymer has a polymerization degree n selected from any positive integer between 800 and 20000.

13. The electrode plate according to claim 1, wherein the adsorptive polymer includes an aldehyde-ketone polymer, which has a slope $K_3$ of an elastic modulus G'-loss modulus G" curve that is measured by subjecting a sheet-like structure formed of the aldehyde-ketone polymer to dynamic frequency scanning tests at ($T_{m4}$+20° C.), and $0.8<K_3<\infty$, where $T_{m4}$° C. represents a melting temperature of the aldehyde-ketone polymer.

14. The electrode plate according to claim 13, wherein the aldehyde-ketone polymer comprises at least one of the compounds shown in Formula (DI) and Formula (DII):

Formula (DI)

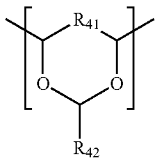

, in which, $R_{41}$ comprises a single bond, a substituted or unsubstituted C1-C6 alkylene group; $R_{42}$ comprises a hydrogen atom, a substituted or unsubstituted C1-C6 alkyl group;

Formula (DII)

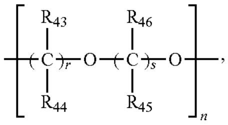

, in which:

R43 to $R_{46}$ each independently comprise a hydrogen atom, a hydroxyl group, a substituted or unsubstituted C1-C3 alkyl group, a substituted or unsubstituted C1-C3 hydroxyalkyl group, or a substituted or unsubstituted C1-C3 alkoxy group; and r and s each independently are an integer selected from 0 to 5, and at least one of r and s is a positive integer; and the aldehyde-ketone polymer has a polymerization degree n selected from any positive integer between 500 and 15000.

15. The electrode plate according to claim 1, wherein the adsorptive polymer has a molecular weight between $2.0\times10^5$ g/mol and $1.2\times10^6$ g/mol.

16. A battery, comprising the electrode plate according to claim 1.

17. The battery according to claim 16, wherein the electrode plate is a positive electrode plate; or the electrode plate is a negative electrode plate.

18. An electrical device, comprising the battery according to claim 16.

19. The electrode plate according to claim 1, wherein the fluoropolymer further comprises fluorinated ethylene propylene copolymer (FEP).

* * * * *